United States Patent
He et al.

(10) Patent No.: US 12,170,980 B2
(45) Date of Patent: Dec. 17, 2024

(54) WIRELESS COMMUNICATION RESOURCE ALLOCATION METHOD AND APPARATUS, AND COMMUNICATION DEVICE

(71) Applicant: HUAWEI TECHNOLOGIES CO., LTD., Shenzhen (CN)

(72) Inventors: Lang He, Shanghai (CN); Wenyue Xia, Shenzhen (CN); Fanfan Hou, Shenzhen (CN); Lei Tang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 355 days.

(21) Appl. No.: 17/685,718

(22) Filed: Mar. 3, 2022

(65) Prior Publication Data
US 2022/0272668 A1    Aug. 25, 2022

Related U.S. Application Data

(63) Continuation of application No. PCT/CN2019/104668, filed on Sep. 6, 2019.

(51) Int. Cl.
*H04W 72/02*    (2009.01)
*H04W 72/0446*  (2023.01)
(Continued)

(52) U.S. Cl.
CPC ....... *H04W 72/02* (2013.01); *H04W 72/0446* (2013.01); *H04W 72/1263* (2013.01); *H04W 72/541* (2023.01); *H04W 72/542* (2023.01)

(58) Field of Classification Search
CPC . H04W 72/02; H04W 72/542; H04W 72/541; H04W 72/0446
See application file for complete search history.

(56) References Cited

U.S. PATENT DOCUMENTS

| 2014/0094183 A1* | 4/2014 | Gao | H04W 72/51 455/450 |
| 2017/0195163 A1 | 7/2017 | Chae et al. | |
| 2018/0054804 A1* | 2/2018 | Luo | H04W 72/02 |

FOREIGN PATENT DOCUMENTS

| CN | 103843444 A | 6/2014 |
| CN | 107277922 A | 10/2017 |

(Continued)

OTHER PUBLICATIONS

WO 2018171388, Machine Language English language translation, "Vehicle Platoon Resource Configuration Method and Related Device", 29 pages (Year: 2018).*

(Continued)

*Primary Examiner* — Won Tae C Kim
(74) *Attorney, Agent, or Firm* — HAUPTMAN HAM, LLP

(57) ABSTRACT

This application provides a wireless communication resource allocation method. A network device allocates, to a terminal device, a first resource pool used to carry communication data and a second resource pool including a candidate resource of the first resource pool, the network device measures a quality parameter of at least one physical resource in the first resource pool and the second resource pool, and the network device sends first indication information to the terminal device when a quality parameter of a first physical resource in the first resource pool satisfies a preset condition #1. The first indication information is used to indicate that the first physical resource in the first resource pool is replaced with a second physical resource, and the second physical resource is a physical resource in the second resource pool.

18 Claims, 10 Drawing Sheets

(51) Int. Cl.
*H04W 72/1263* (2023.01)
*H04W 72/541* (2023.01)
*H04W 72/542* (2023.01)

(56) References Cited

FOREIGN PATENT DOCUMENTS

| CN | 108633048 A | 10/2018 |
|---|---|---|
| WO | 2018171388 A1 | 9/2018 |

OTHER PUBLICATIONS

LG Electronics Inc., Resource pool coordination for partial coverage. 3GPP TSG-RAN WG2 #87, Dresden, Germany, Aug. 18-22, 2014, R2-143738, 4 pages.
International Search Report issued in corresponding International Application No. PCT/CN2019/104668, dated May 27. 2020, pp. 1-9.
Huawei, HiSilicon, Sidelink resource allocation mode 1. 3GPP TSG RAN WGI Meeting #98, Prague, Czech Republic, Aug. 26-30, 2019, R1-1908041, 14 pages.
Extended European Search Report issued in corresponding European Application No. 19944090.0, dated Jul. 7, 2022, pp. 1-11.

* cited by examiner

WIRELESS COMMUNICATION RESOURCE ALLOCATION METHOD AND APPARATUS, AND COMMUNICATION DEVICE

CROSS-REFERENCE TO RELATED APPLICATIONS

This application is a continuation of International Application No. PCT/CN2019/104668, filed on Sep. 6, 2019, the disclosure of which is hereby incorporated by reference in its entirety.

TECHNICAL FIELD

This application relates to the communication field, and more specifically, to a wireless communication resource allocation method.

BACKGROUND

Currently, due to division of spectrum resources and development of communication standards and industry requirements in some countries and regions, some frequency bands, especially low frequency bands, suffer high interference. Because radio modems, long term evolution (LTE) system devices, and the like all use frequency resources in the low frequency bands for communication, low frequency band communication is greatly interfered. As a result, a communication data transmission delay increases, and service requirements cannot be ensured. In view of this, some communication methods need to be used to avoid interfering frequencies to ensure normal running of uplink and downlink services.

A frequency hopping technology is usually used to avoid interference. Frequency hopping means that a frequency used by each carrier hops in a preset group of frequencies based on a frequency hopping sequence as a frame changes. The group of frequencies are called a frequency hopping group. A carrier hopping sequence is controlled by a frequency hopping sequence number, and the frequency hopping sequence number is generated by using a pseudo random code. Through the frequency hopping technology, even if some frequencies are interfered during uplink and downlink data transmission, communication can still be performed at other frequencies that are not interfered. In terms of frequency domain, the frequency hopping is classified into group hopping, symmetric frequency hopping, and single carrier frequency-based frequency hopping. In terms of time domain, the frequency hopping is classified into single time unit-based frequency hopping and multiple time units-based joint frequency hopping. However, the frequency hopping can only average interference when communication is interfered by a fixed frequency for a long time. Application scenarios of avoiding interference through frequency hopping are restricted.

Therefore, how to effectively avoid interference and improve wireless communication data reliability is an urgent problem to be resolved currently.

SUMMARY

This application provides a wireless communication resource allocation method, to reduce impact of interference on data transmission, and improve data transmission reliability.

According to a first aspect, a wireless communication resource allocation method is provided. The method may be performed by a network device or a module (for example, a chip) configured in the network device. An example in which the method is performed by the network device is used for description below.

The method includes: A network device allocates a first resource pool and a second resource pool to a terminal device, where the first resource pool includes K physical resources, a physical resource in the first resource pool is used to carry communication data, the second resource pool includes L physical resources, a physical resource in the second resource pool is a candidate resource of the first resource pool, and K and L are integers greater than or equal to 1; the network device measures a quality parameter of at least one physical resource in the first resource pool; and the network device sends first indication information to the terminal device when a quality parameter of a first physical resource in the first resource pool satisfies a first preset condition. The first indication information is used to indicate that the first physical resource in the first resource pool is replaced with a second physical resource, and the second physical resource is a physical resource in the second resource pool.

According to the solution of this application, the network device allocates, to the terminal device, one first resource pool used to receive and/or send communication data and one second resource pool that is a candidate resource pool of the first resource pool, and the network device periodically measures the at least one physical resource in the first resource pool. The first physical resource (that is, whose quality parameter satisfies the first preset condition) with high interference in the first resource pool is replaced with the second physical resource, so that interference on the resource that is in the first resource pool and that is used for communication between the network device and the terminal device is kept low, thereby avoiding interference, improving data transmission reliability, and reducing transmission delay.

With reference to the first aspect, in some implementations of the first aspect, the quality parameter of the physical resource includes at least one of the following parameters: received interference power RIP on the physical resource, energy of interference on the physical resource, a ratio of noise to a valid signal on the physical resource, or strength of an interfering signal on the physical resource.

With reference to the first aspect, in some implementations of the first aspect, that a quality parameter of a first physical resource in the first resource pool satisfies a first preset condition includes at least one of the following cases:

Case 1: A quality parameter value of the first physical resource is greater than a first preset threshold.

In this case, the first preset condition is that the quality parameter value is greater than the first preset threshold.

By way of example rather than limitation, the first preset threshold may be preset in a system or specified in a protocol. The first preset threshold may alternatively be obtained by calculating a plurality of parameters. For example, the first preset threshold is a sum of values of an interference offset, a noise coefficient, and a noise floor.

For example, a RIP value is greater than the threshold, energy of interference on the physical resource is greater than the first preset threshold, a ratio of noise to a valid signal on the physical resource is greater than the first preset threshold, or strength of an interfering signal on the physical resource is greater than the first preset threshold.

Case 2: A quality parameter value of the first physical resource is greater than a quality parameter value of the second physical resource.

In this case, the first preset condition is that the quality parameter value is greater than the quality parameter value of the second physical resource For example, when a RIP value of the first physical resource in the first resource pool is greater than a RIP value of the second physical resource, the first physical resource is replaced with the second physical resource.

Case 3: A quality parameter value of the first physical resource is greater than a quality parameter value of at least one physical resource in the second resource pool.

In this case, the first preset condition is that the quality parameter value is greater than the quality parameter value of the at least one physical resource in the second resource pool.

For example, when a RIP value of the first physical resource in the first resource pool is greater than a RIP value of a third physical resource in the second resource pool, the first physical resource is replaced with the second physical resource in the second resource pool.

In this application, there are R first physical resources in the first resource pool, and R is an integer greater than or equal to 0. Correspondingly, the R first physical resources are replaced with R second physical resources in the second resource pool.

With reference to the first aspect, in some implementations of the first aspect, the second physical resource includes at least one of the following resources:

first, a resource A, where the second physical resource is any one or more physical resources in the second resource pool.

As long as the first resource pool includes a physical resource whose quality parameter satisfies the first preset condition, the network device selects any one or more second physical resources in the second resource pool to replace first physical resources, where the second physical resources and the first physical resources have a same quantity. For example, the network device ensures that the physical resource in the second resource pool is a resource on which interference is low. When the network device measures the first resource pool and finds the physical resource whose quality parameter satisfies the first preset condition, the network device selects any R second physical resources in the second resource pool to replace R first physical resources in the first resource pool. However, this application is not limited thereto.

Second, a resource B, which is a physical resource whose quality parameter value is the lowest in the second resource pool.

When the first resource pool includes R first physical resources, the network device selects R physical resources whose quality parameter values are lowest and that are in the second resource pool to replace the R first physical resources.

Third, a resource C, which is a physical resource whose quality parameter value is lower than a second preset threshold in the second resource pool.

When the first resource pool includes the first physical resource, the network device selects the physical resource whose quality parameter value is lower than the second preset threshold in the second resource pool to replace the first physical resource.

By way of example rather than limitation, when quality parameters of m first physical resources in the first resource pool are lower than the first preset threshold, and quality parameter values of n second physical resources in the second resource pool are lower than the second preset threshold, if m≥n, n first physical resources in the first resource pool are replaced with the n second physical resources in the second resource pool; if m<n, the m first physical resources in the first resource pool are replaced with m second physical resources in the second resource pool, where m and n are integers greater than or equal to 0.

By way of example rather than limitation, the second preset threshold is equal to or lower than first preset threshold.

Fourth, a resource D, which is a physical resource whose quality parameter value is lower than the quality parameter value of the first physical resource and that is in the second resource pool.

The network device selects the physical resource whose quality parameter value is lower than the quality parameter value of the first physical resource and that is in the second resource pool to replace the first physical resource. When quality parameters of m first physical resources in the first resource pool are lower than the first preset threshold, and the second resource pool includes n second physical resources that satisfy the resource D, if m≥n, n first physical resources in the first resource pool are replaced with the n second physical resources in the second resource pool; if m<n, the m first physical resources in the first resource pool are replaced with m second physical resources in the second resource pool, where a quality parameter value of a replaced first physical resource is greater than a quality parameter value of a second physical resource that replaces the first physical resource, and m and n are integers greater than or equal to 0.

It should be noted that one or more of four resource forms of the second physical resource may be combined with one or more of three cases in which the quality parameter of the first physical resource is lower than the first preset threshold. For example, the case 1 is combined with the resource D. To be specific, when the quality parameter value of the first physical resource in the first resource pool is greater than the first threshold, and the quality parameter value of the second physical resource in the second resource pool is lower than that of the first physical resource, the first physical resource is replaced with the second physical resource. For another example, the case 1 is combined with the resource C and the resource D. To be specific, when the quality parameter value of the first physical resource in the first resource pool is greater than the first threshold, and the quality parameter value of the second physical resource in the second resource pool is lower than the quality parameter value of the first physical resource and is lower than the second preset threshold, the first physical resource is replaced with the second physical resource. However, this application is not limited thereto.

With reference to the first aspect, in some implementations of the first aspect, the first indication information is carried in at least one of the following messages: a system message, a radio resource control RRC message, or downlink control information.

With reference to the first aspect, in some implementations of the first aspect, the first indication information specifically indicates an index value of each physical resource included in the first resource pool obtained after the replacement.

The network device notifies, by indicating the index value of each physical resource included in the first resource pool obtained after the replacement, the terminal device that the first physical resource in the original first resource pool is replaced with the second physical resource.

With reference to the first aspect, in some implementations of the first aspect, the first indication information specifically indicates an index value of the first physical resource and an index value of the second physical resource.

The network device notifies, by directly indicating the index value of the replaced first physical resource in the original first resource pool and the index value of the second physical resource that replaces the first physical resource, the terminal device that the first physical resource in the original first resource pool is replaced with the second physical resource, and the terminal device determines a physical resource included in a current first resource pool.

According to the solution of this application, the first indication information is used to notify the terminal device of the replaced physical resource in the first resource pool, so that when the network device and the terminal device reach a consensus on the physical resource included in the first resource pool, interference on the physical resource in the first resource pool is kept low, to improve data transmission reliability.

With reference to the first aspect, in some implementations of the first aspect, the method further includes: The network device determines, according to a preset rule in a first time unit, a one-to-one correspondence between the K physical resources in the first resource pool and K logical resources. That the first physical resource in the first resource pool is replaced with a second physical resource includes: The first physical resource that corresponds to a first logical resource and that is indicated by the preset rule is replaced with the second physical resource in the first time unit.

By way of example rather than limitation, the preset rule is preset in a system, is specified in a protocol, or is indicated by the network device.

By way of example rather than limitation, the preset rule is that the K logical resources that are in the one-to-one correspondence with the K physical resources in the first resource pool are determined based on a sequence used at a time interval.

For example, the logical resources that are in the one-to-one correspondence with the K physical resources in the first time pool are determined based on a sequence A used in the first resource pool in a time unit A. To be specific, a sequence number of a physical resource in the first resource pool is multiplied by a value corresponding to the physical resource in the sequence A to obtain a sequence number of a logical resource corresponding to the physical resource. However, this application is not limited thereto.

With reference to the first aspect, in some implementations of the first aspect, the method further includes: The network device sends second indication information to the terminal device, where the second indication information is used to indicate P logical resources scheduled in the time unit, where P is an integer less than or equal to K; and the network device sends downlink data to the terminal device on physical resources corresponding to the P logical resources, or the network device receives, on physical resources corresponding to the P logical resources, uplink data sent by the terminal device.

According to the solution of this application, the physical resource in the first resource pool is maintained, so that interference on the physical resource in the first resource pool is kept low. In addition, with reference to a frequency hopping data transmission method, anti-interference capability of data transmission can be further improved, and data transmission reliability can be ensured.

By way of example rather than limitation, the second indication information indicates the scheduled logical resource by using a bitmap (or which may be referred to as a bit string), and indicator bits in the bitmap are in a one-to-one correspondence with the logical resources. When an indicator bit in the bitmap indicates "1", it indicates that a logical resource corresponding to the indicator bit is scheduled. When an indicator bit in the bitmap indicates "0", it indicates that a logical resource corresponding to the indicator bit is not scheduled. Alternatively, on the contrary, when an indicator bit in the bitmap indicates "0", it indicates that a logical resource corresponding to the indicator bit is scheduled. When an indicator bit in the bitmap indicates "1", it indicates that a logical resource corresponding to the indicator bit is not scheduled.

According to this solution, in a manner in which the second indication information schedules a transmission resource by using the bitmap, the network device can schedule one or more continuous logical resources, or can schedule one or more discontinuous logical resources.

By way of example rather than limitation, the second indication information specifically indicates one or more continuous scheduled logical resources by using a resource indication value (RIV). The terminal device may determine a sequence number of a scheduled start logical resource and a quantity of sequence numbers of the continuous logical resources based on the resource indication value, to determine a sequence number of each scheduled logical resource.

According to this solution, in a manner in which the second indication information schedules the transmission resource by using the RIV, a quantity of bits indicating the scheduled logical resource can be reduced, thereby reducing overheads of control information.

With reference to the first aspect, in some implementations of the first aspect, the second indication information is carried in at least one of the following information: downlink control information for scheduling the uplink data, downlink control information for scheduling the downlink data, or an RRC message for allocating a resource to scheduling-free data.

With reference to the first aspect, in some implementations of the first aspect, the time unit is at least one of the following time units: a slot, a subframe, a frame, or an orthogonal frequency division multiple access OFDM symbol.

With reference to the first aspect, in some implementations of the first aspect, the physical resource includes at least one frequency domain resource of a carrier resource, a bandwidth resource, or a physical resource block RB.

According to a second aspect, a wireless communication method is provided. The method may be performed by a terminal device or a module (for example, a chip) configured in the terminal device. An example in which the method is performed by the terminal device is used for description below.

The method includes the following steps. The terminal device determines a first resource pool allocated by a network device to the terminal device, where the first resource pool includes K physical resources, a physical resource in the first resource pool is used to carry communication data, and K is an integer greater than or equal to 0; the terminal device receives first indication information sent by the network device, where the first indication information is used to indicate that a first physical resource in the first resource pool is replaced with a second physical resource, the second physical resource is a physical resource in a second resource pool allocated by the network device to the terminal device, the second resource pool includes a candidate resource of the first resource pool, the second resource pool includes L physical resources, and L is an integer greater than or equal to 1; and the terminal device replaces the first physical resource with the second physical resource based on the first indication information.

With reference to the second aspect, in some implementations of the second aspect, the second physical resource includes at least one of the following resources:
  a physical resource whose quality parameter value is the lowest in the second resource pool;
  a physical resource whose quality parameter value is lower than a second preset threshold in the second resource pool; or
  a physical resource whose quality parameter value is lower than a quality parameter value of the first physical resource and that is in the second resource pool.

With reference to the second aspect, in some implementations of the second aspect, the first indication information is carried in at least one of the following messages: a system message, a radio resource control RRC message, or downlink control information.

By way of example rather than limitation, the first indication information specifically indicates an index value of each physical resource included in the first resource pool obtained after the replacement.

By way of example rather than limitation, the first indication information specifically indicates an index value of the first physical resource and an index value of the second physical resource.

With reference to the second aspect, in some implementations of the second aspect, the terminal device determines, according to a preset rule in a first time unit, a one-to-one correspondence between the K physical resources in the first resource pool and K logical resources. That a first physical resource in the first resource pool is replaced with a second physical resource includes: The first physical resource that corresponds to a first logical resource and that is indicated by the preset rule is replaced with the second physical resource in the first time unit.

With reference to the second aspect, in some implementations of the second aspect, the terminal device receives second indication information sent by the network device, where the second indication information is used to indicate P logical resources scheduled in the time unit, and P is an integer less than or equal to K; and the terminal device receives, on physical resources corresponding to the P logical resources, downlink data sent by the network device, or the terminal device sends uplink data to the network device on physical resources corresponding to the P logical resources.

With reference to the second aspect, in some implementations of the second aspect, the second indication information is at least one of the following information: downlink control information for scheduling the uplink data, downlink control information for scheduling the downlink data, or an RRC message for allocating a resource to scheduling-free data.

With reference to the second aspect, in some implementations of the second aspect, the time unit is at least one of the following time units: a slot, a subframe, a frame, or an orthogonal frequency division multiple access OFDM symbol.

With reference to the second aspect, in some implementations of the second aspect, the physical resource is at least one frequency domain resource of a carrier resource, a bandwidth resource, or a physical resource block RB.

According to a third aspect, a wireless communication method is provided. The method may be performed by a network device or a module (for example, a chip) configured in the network device. An example in which the method is performed by the network device is used for description below.

The method includes: The network device allocates a first resource pool to a terminal device, where the first resource pool includes K physical resources, a physical resource in the first resource pool is used to carry communication data, and K is an integer greater than or equal to 1; the network device measures a quality parameter of at least one physical resource in the first resource pool; and the network device sends third indication information to the terminal device when a quality parameter of a first physical resource in the first resource pool satisfies a first preset condition, where the third indication information is used to indicate the first physical resource, and the first physical resource is not used to carry communication data.

With reference to the third aspect, in some implementations of the third aspect, the quality parameter of the physical resource includes at least one of the following parameters: received interference power RIP on the physical resource, energy of interference on the physical resource, a ratio of noise to a valid signal on the physical resource, or strength of an interfering signal on the physical resource.

With reference to the third aspect, in some implementations of the third aspect, that a quality parameter of a first physical resource in the first resource pool satisfies a first preset condition includes at least one of the following cases:
  A quality parameter value of the first physical resource is greater than a first preset threshold;
  a quality parameter value of the first physical resource is greater than a quality parameter value of a second physical resource; or
  a quality parameter value of the first physical resource is greater than a quality parameter value of at least one physical resource in a second resource pool.

With reference to the third aspect, in some implementations of the third aspect, the network device determines, according to a preset rule in a first time unit, a one-to-one correspondence between the K physical resources in the first resource pool and K logical resources.

With reference to the third aspect, in some implementations of the third aspect, the network device sends second indication information to the terminal device, where the second indication information is used to indicate P logical resources scheduled in the first time unit, where the P logical resources do not include a logical resource corresponding to the first physical resource in the first time unit, and P is an integer less than or equal to K; and the network device sends downlink data to the terminal device on physical resources corresponding to the P logical resources, or the network device receives, on physical resources corresponding to the P logical resources, uplink data sent by the terminal device.

With reference to the third aspect, in some implementations of the third aspect, the network device sends fourth indication information to the terminal device, where the fourth indication information is used to allocate, to the terminal device, W logical resources for grant-free transmission, and W is an integer less than or equal to K; and when a physical resource corresponding to one of the W logical resources in the first time interval is the first physical resource, the network device does not receives the uplink data on the first physical resource, or the network device does not receive the downlink data on the first physical resource.

According to a fourth aspect, a wireless communication method is provided. The method may be performed by a terminal device or a module (for example, a chip) configured in the terminal device. An example in which the method is performed by the terminal device is used for description below.

The method includes: The terminal device determines a first resource pool allocated by a network device to the terminal device, where the first resource pool includes K physical resources, a physical resource in the first resource pool is used to carry communication data, and K is an integer greater than or equal to 1; and the terminal device receives third indication information sent by the network device, where the third indication information is used to indicate a first physical resource, and the first physical resource is not used to carry communication data.

With reference to the fourth aspect, in some implementations of the fourth aspect, the terminal device determines, according to a preset rule in a first time unit, a one-to-one correspondence between the K physical resources in the first resource pool and K logical resources.

With reference to the fourth aspect, in some implementations of the fourth aspect, the terminal device receives second indication information sent by the network device, where the second indication information is used to indicate P logical resources scheduled in the first time unit, the P logical resources do not include a logical resource corresponding to the first physical resource in the first time unit, and P is an integer less than or equal to K; and
- the terminal device receives, on physical resources corresponding to the P logical resources, downlink data sent by the network device, or
- the terminal device sends uplink data to the network device on physical resources corresponding to the P logical resources.

With reference to the fourth aspect, in some implementations of the fourth aspect, the terminal device receives fourth indication information sent by the network device, where the fourth indication information is used to allocate, to the terminal device, W logical resources for grant-free transmission, and W is an integer less than or equal to K; and when a physical resource corresponding to one of the W logical resources in the first time interval is the first physical resource, the network device does not receives the uplink data on the first physical resource, or the network device does not receive the downlink data on the first physical resource.

According to a fifth aspect, a communication apparatus is provided. The communication apparatus includes modules or units configured to perform the method according to any one of the first aspect or the third aspect and the possible implementations of the first aspect or the third aspect.

According to a sixth aspect, a communication apparatus is provided. The communication apparatus includes a processor. The processor is coupled to a memory, and may be configured to perform the method according to any one of the first aspect or the third aspect and the possible implementations of the first aspect or the third aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface. Optionally, the transceiver may be a transceiver circuit. Optionally, the input/output interface may be an input/output circuit.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a seventh aspect, a communication apparatus is provided. The communication apparatus includes modules or units configured to perform the method according to any one of the second aspect or the fourth aspect and the possible implementations of the second aspect or the fourth aspect.

According to an eighth aspect, a communication apparatus is provided. The communication apparatus includes a processor. The processor is coupled to a memory, and may be configured to execute instructions in the memory, to implement the method according to any one of the second aspect or the fourth aspect and the possible implementations of the second aspect or the fourth aspect. Optionally, the communication apparatus further includes the memory. Optionally, the communication apparatus further includes a communication interface, and the processor is coupled to the communication interface. Optionally, the transceiver may be a transceiver circuit. Optionally, the input/output interface may be an input/output circuit.

In an implementation, the communication apparatus is a network device. When the communication apparatus is the network device, the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, a processor is provided. The processor includes an input circuit, an output circuit, and a processing circuit. The processing circuit is configured to receive a signal through the input circuit, and transmit a signal through the output circuit, so that the method according to any one of the first aspect to the fourth aspect and any one of the possible implementations of the first aspect to the fourth aspect is implemented.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in the embodiments of this application.

According to a tenth aspect, a processing apparatus is provided. The processing apparatus includes a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in the embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processor according to the tenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to an eleventh aspect, a computer program product is provided. The computer program product includes a computer program (which may also be referred to as code or instructions). When the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or instructions). When the computer program is run on a computer, the computer is enabled to perform the method according to any one of the first aspect to the fourth aspect and the possible implementations of the first aspect to the fourth aspect.

According to a thirteenth aspect, a communication system is provided. The communication system includes the foregoing network device and terminal device.

DESCRIPTION OF EMBODIMENTS

The following describes technical solutions of this application with reference to the accompanying drawings.

The technical solutions in the embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system or a new radio (NR) system, a vehicle-to-everything (V2X) system, a long term evolution-vehicle (LTE-V) system, an internet of vehicles system, a machine type communication (MTC) system, an internet of things (IoT) system, a long term evolution-machine (LTE-M) system, and a machine to machine (M2M) system, where V2X may include vehicle to network (V2N), vehicle to vehicle (V2V), vehicle to infrastructure (V2I), vehicle to pedestrian (V2P), and the like.

Figure 1:
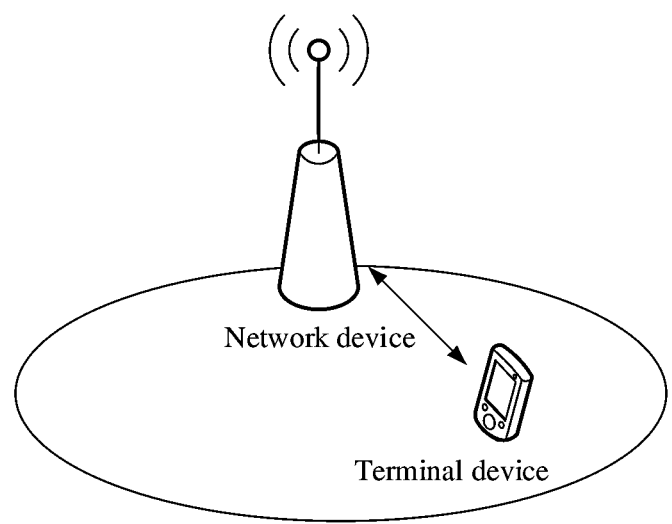
FIG. 1 is a schematic diagram of an architecture of a communication system according to this application.

FIG. 1 is a schematic diagram of a wireless communication system 100 applicable to an embodiment of this application.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. A plurality of antennas may be configured for each of the network device and the terminal device. The network device and the terminal device may communicate with each other by using a multi-antenna technology.

The terminal device in the embodiments of this application may also be referred to as user equipment (UE), an access terminal, a subscriber unit, a subscriber station, a mobile station, a mobile station, a remote station, a remote terminal, a mobile device, a user terminal, a terminal, a wireless communication device, a user agent, a user apparatus, or the like. The terminal device in the embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smart watches or smart glasses, and devices that focus on only one type of application function and need to work with other devices such as smartphones, for example, various smart bands or smart jewelry for monitoring physical signs.

In addition, the terminal device may alternatively be a terminal device in an internet of things (IoT) system. IoT is an important part in development of future information technologies. A main technical feature of the IoT is to connect an object to a network by using a communication technology, to implement an intelligent network for human-machine interconnection and thing-thing interconnection.

It should be understood that a specific form of the terminal device is not limited in this application.

In this embodiment of this application, the network device may be any device having a wireless transceiver function. The device includes but is not limited to an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the network device may be a gNB or a transmission point (TRP or TP) in a 5G (for example, NR) system, may be one antenna panel or a group (including a plurality of antenna panels) of antenna panels of a base station in a 5G system, or may be a network node, for example, a baseband unit (BBU) or a distributed unit (DU), that constitutes a gNB or a transmission point.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and a non-real-time service, and implements functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or may be classified into a network device in a core network (CN). This is not limited in this application.

The network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells are characterized by small coverage and a low transmit power, and are applicable to providing a high-rate data transmission service.

Figure 2:
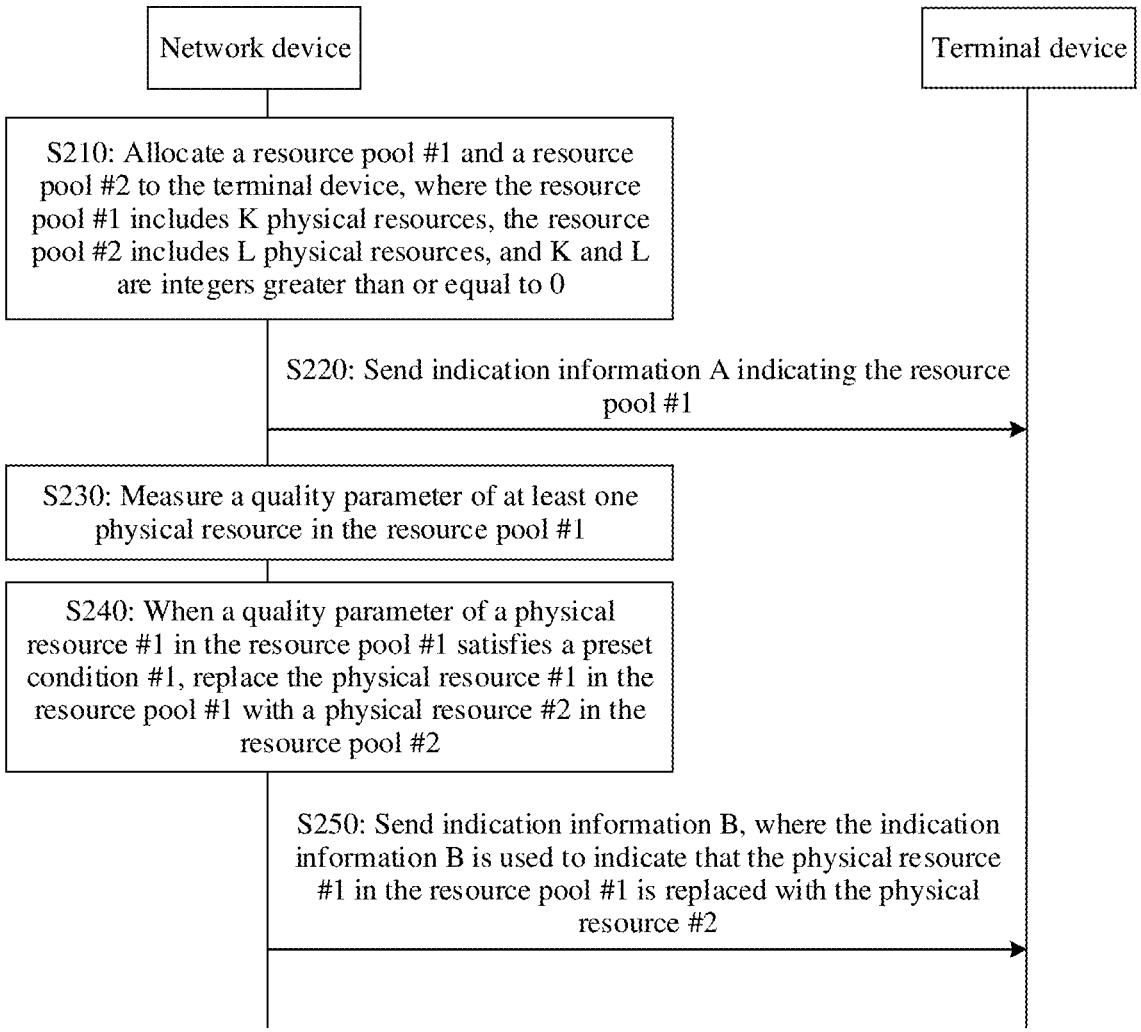
FIG. 2 is a schematic flowchart of a wireless communication resource allocation method according to this application.

FIG. 2 is a schematic flowchart of a wireless communication resource allocation method according to this application.

S210: A network device allocates a resource pool #1 (namely, an example of a first resource pool) and a resource pool #2 (namely, an example of a second resource pool) to a terminal device, where the resource pool #1 includes K physical resources, the resource pool #2 includes L physical resources, and K and L are integers greater than or equal to 0.

In this application, after the terminal device accesses the network device, the network device allocates two parts of resources to the terminal device. The first part is the resource pool #1, and the second part is the resource pool #2. A physical resource in the resource pool #1 is used to carry communication data of the terminal device. A physical resource in the resource pool #2 is a candidate resource of the resource pool #1. When a quality parameter of the physical resource in the resource pool #1 satisfies a preset condition #1, the physical resource in the resource pool #2 is selected to replace the physical resource whose quality parameter satisfies the preset condition #1 and that is in the resource pool #1.

By way of example rather than limitation, the resource pool #1 and the resource pool #2 are sets of uplink physical resources used to carry uplink data, or the resource pool #1 and the resource pool #2 are sets of downlink physical resources used to carry downlink data. When the resource pool #1 is the set of uplink physical resources, the network device schedules the physical resource in the resource pool #1 for the terminal device, the terminal device sends the uplink data on the scheduled physical resource in the resource pool #1, and the network device receives, on the scheduled physical resource, the uplink data sent by the terminal device. When the resource pool #1 is the set of downlink physical resources, the network device indicates, to the terminal device, scheduled physical resource in the resource pool #1, the network device sends the downlink data on the scheduled physical resource in the resource pool #1, and the terminal device receives, on the scheduled physical resource, the downlink data sent by the network device.

By way of example rather than limitation, the physical resource is a frequency domain resource, and may be at least one frequency domain resource of a carrier resource, a bandwidth resource, or a resource block RB.

S220: The network device sends, to the terminal device, indication information A used to indicate the resource pool #1.

The network device notifies, by using the indication information A, the terminal device of the resource pool #1 allocated by the network device to the terminal device. By way of example rather than limitation, the indication information A may indicate an index value of each physical resource included in the resource pool #1. For example, the physical resource is the carrier resource, and the indication information A indicates a carrier number of each carrier (namely, an index value of the carrier) included in the resource pool #1. By way of example rather than limitation, the physical resources included in the resource pool #1 may be continuous physical resources, and the indication information A may alternatively indicate an index value of a start physical resource in the resource pool #1 and a quantity of physical resources included in the resource pool #1. After receiving the indication information A, the terminal device determines each physical resource in the resource pool #1 based on the index value of the start physical resource and the quantity of physical resources.

By way of example rather than limitation, the indication information A may be at least one of the following messages: a system message, an RRC message, and downlink control information. For example, the indication information A is a system message 3 (system information block 3, SIB 3).

Optionally, the network device sends, to the terminal device, indication information used to indicate the resource pool #2.

S230: The network device measures a quality parameter of at least one physical resource in the resource pool #1.

In this application, the network device may periodically measure the quality parameter of the at least one physical resource in the resource pool #1, or may measure the quality parameter of the at least one physical resource in the resource pool #1 when the network device needs to schedule the physical resource in the resource pool #1. However, this application is not limited thereto.

By way of example rather than limitation, the network device measures a quality parameter of each physical resource in the resource pool #1.

By way of example rather than limitation, the network device measures quality of at least one physical resource in the resource pool #2.

The network device may periodically measure the physical resource in the resource pool #2, and a periodicity may be the same as a periodicity at which the resource pool #1 is measured. In other words, at one periodicity, the physical resource in the resource pool #1 and the physical resource in the resource pool #2 are measured.

Alternatively, the network device may measure the quality parameter of each physical resource in the resource pool #1, and measure the quality parameter of the at least one physical resource in the resource pool #2 when the quality parameter of the at least one physical resource in the resource pool #1 satisfies the preset condition #1. Alternatively, when the network device needs to communicate with the terminal device, the network device measures quality parameters of P physical resources that need to be scheduled by the network device and that are in the resource pool #1.

S240: When a quality parameter of a physical resource #1 in the resource pool #1 satisfies the preset condition #1, the physical resource #1 (namely, an example of a first physical resource) in the resource pool #1 is replaced with a physical resource #2 (namely, an example of a second physical resource) in the resource pool #2.

In this application, after the network device measures the quality parameter of the at least one physical resource in the resource pool #1 and the resource pool #2, when the quality parameter of the physical resource #1 in the resource pool #1 satisfies the preset condition #1, the physical resource #2 in the resource pool #2 is selected to replace the physical resource #1 in the resource pool #1. After the replacement, the resource pool #1 includes the physical resource #2 but does not include the physical resource #1, and the resource pool #2 includes the physical resource #1 but does not include the physical resource #2.

By way of example rather than limitation, the quality parameter of the physical resource may be received interference power (RIP) on the physical resource, energy of interference on the physical resource, a ratio of noise to a valid signal on the physical resource, or strength of an interfering signal on the physical resource. This is not limited in this application.

That a quality parameter of a physical resource #1 satisfies the preset condition #1 includes at least one of the following cases:

Case 1: A quality parameter value of the physical resource #1 is greater than a preset threshold #1 (namely, an example of a first threshold).

For example, a RIP value is greater than the threshold #1, energy of interference on the physical resource is greater than the preset threshold #1, a ratio of noise to a valid signal on the physical resource is greater than the preset threshold #1, or strength of an interfering signal on the physical resource is greater than the preset threshold #1. By way of example rather than limitation, the preset threshold #1 may be preset in a system or specified in a protocol. The preset threshold #1 may alternatively be obtained by calculating a plurality of parameters. For example, the preset threshold #1 is a sum of values of an interference offset, a noise coefficient, and a noise floor.

Case 2: A quality parameter value of the physical resource #1 is greater than a quality parameter value of the physical resource #2.

For example, when a RIP value of the physical resource #1 is greater than a RIP value of the physical resource #2, the physical resource #1 is replaced with the physical resource #2.

Case 3: A quality parameter value of the physical resource #1 is greater than a quality parameter value of the at least one physical resource in the physical resource #2.

For example, when a RIP value of the physical resource #1 is greater than a RIP value of a physical resource #3 in the resource pool #2, the physical resource #1 is replaced with the physical resource #2.

The resource pool #1 includes R physical resources #1, and R is an integer greater than or equal to 0. Correspondingly, the R physical resources #1 are replaced with R physical resources #2 in the resource pool #2.

Figure 3:
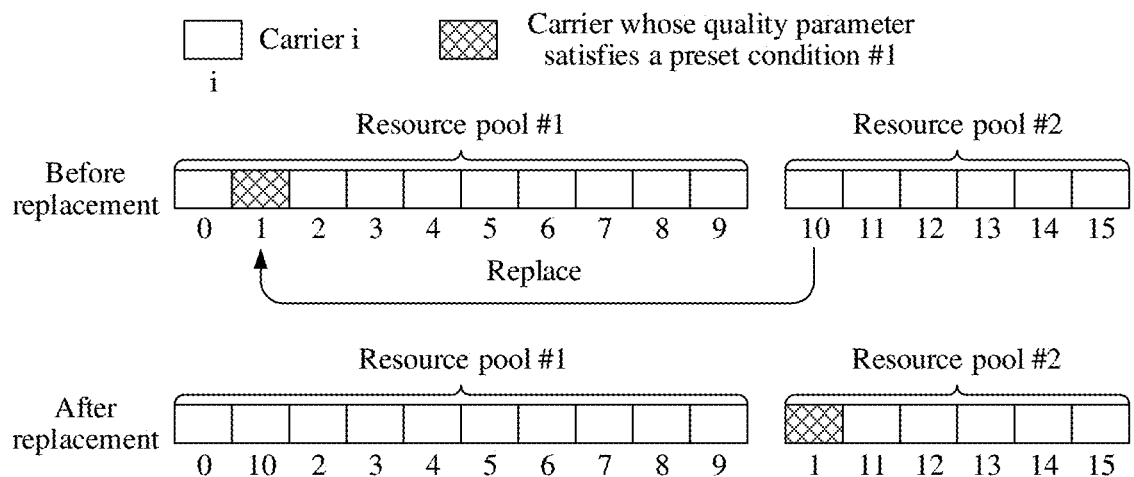
FIG. 3 is a schematic diagram of an example in which a first physical resource in a first resource pool is replaced with a second physical resource in a second resource pool according to this application.

For example, as shown in FIG. 3, the physical resources in the resource pool #1 are carrier resources, the resource pool #1 includes carriers whose index values are 0, 1, 2, 3, 4, 5, 6, 7, 8, and 9, and candidate carriers of the resource pool #1 are five carriers whose index values are 10, 11, 12, 13, 14, and 15 and that are in the resource pool #2. The network device measures at least one carrier in the resource pool #1. After the measurement, the network device determines that a quality parameter of the carrier 1 (that is, the carrier 1 is the physical resource #1) satisfies the first preset condition (for example, a RIP value of the carrier 1 is greater than the preset threshold), and the network device selects the carrier 10 in the resource pool #2 to replace the carrier 1 in the resource pool #1. After the replacement, the resource pool #1 includes the carrier 10 but does not include the carrier 1, and the resource pool #2 includes the carrier 1 but does not include the carrier 10.

Figure 4:
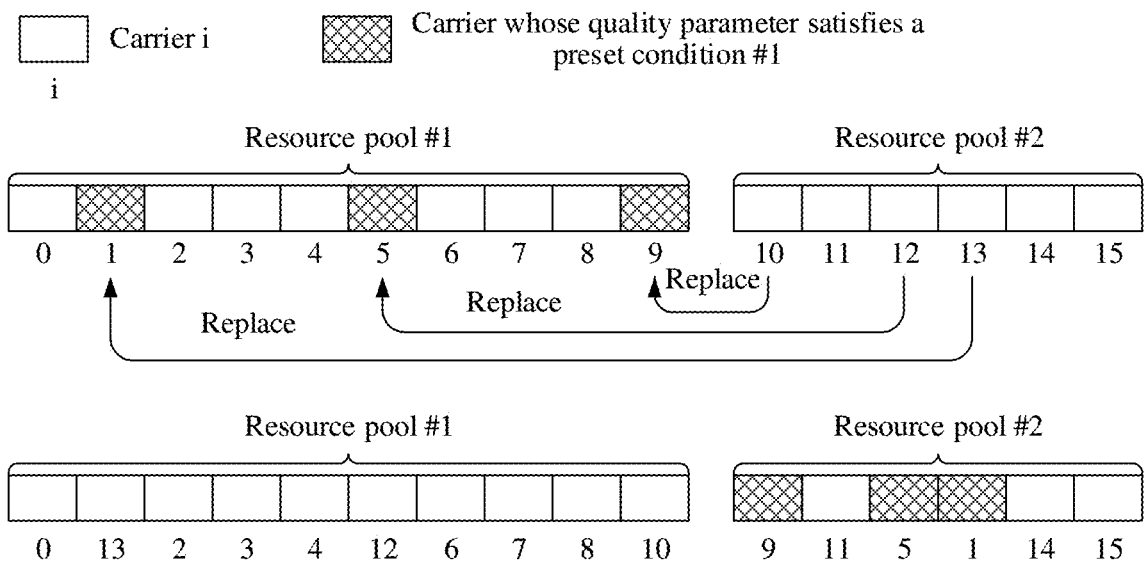
FIG. 4 is a schematic diagram of another example in which a first physical resource in a first resource pool is replaced with a second physical resource in a second resource pool according to this application.

For another example, as shown in FIG. 4, the physical resources in the resource pool #1 are carrier resources, the resource pool #1 includes carriers whose index values are 0, 1, 2, 3, 4, 5, 6, 7, 8, and 9, and candidate carriers of the resource pool #1 are five carriers whose index values are 10, 11, 12, 13, 14, and 15 and that are in the resource pool #2. The network device measures at least one carrier in the resource pool #1 and the resource pool #2. After the measurement, the network device determines that quality parameters of the carrier 1, the carrier 5, and the carrier 9 satisfy the preset condition #1 (that is, the carrier 1, the carrier 5, and the carrier 9 are physical resources #1), and the network device selects the carrier 10, the carrier 12, and the carrier 13 in the resource pool #2 (that is, the carrier 10, the carrier 12, and the carrier 13 are physical resources #1) to respectively replace the carrier 1, the carrier 5, and the carrier 9 in the resource pool #1. After the replacement, the resource pool #1 includes the carrier 10, the carrier 12, and the carrier 13 but does not include the carrier 1, the carrier 5, and the carrier 9, and the resource pool #2 includes the carrier 1, the carrier 5, and the carrier 9 but does not include the carrier 10, the carrier 12, and the carrier 13.

In this application, when the quality parameter of the physical resource #1 in the resource pool #1 satisfies the preset condition #1, the physical resource #2 that is selected by the network device to replace the physical resource #1 includes at least one of the following resources:

first, a resource A, where the physical resource #2 is any one or more physical resources in the resource pool #2.

To be specific, as long as the resource pool #1 includes a physical resource whose quality parameter satisfies the preset condition #1, the network device selects any one or more physical resources #2 in the resource pool #2 to replace physical resources #1 in the resource pool #1, where the physical resources #2 and the physical resources #1 have a same quantity. For example, the network device ensures that the physical resource in the resource pool #2 is a resource with good quality. After the network device measures the resource pool #1 and finds the physical resource whose quality parameter satisfies the preset condition #1, the network device selects any one or more physical resources #2 in the resource pool #2 to replace the physical resources #1. However, this application is not limited thereto.

Second, a resource B, which is a physical resource whose quality parameter value is the lowest in the resource pool #2.

When the resource pool #1 includes one physical resource #1, the network device selects a physical resource #2 whose quality parameter value is the lowest in the resource pool #2 to replace the physical resource #1. For example, in an example in FIG. 3, if the carrier 10 is a carrier whose quality parameter value is the lowest (for example, a carrier whose RIP value is the lowest) in the five carriers in the resource pool #2, the network device selects the carrier 10 to replace the carrier 1.

When the resource pool #1 includes a plurality of physical resources #1, the network device selects R physical resources #2 whose quality parameter values are the lowest in the resource pool #2 to replace R physical resources #1. For example, in an example in FIG. 4, if the carrier 10, the carrier 12, and the carrier 13 are three carriers whose quality parameter values are the lowest (for example, three carriers whose RIP values are the lowest) in the five carriers in the resource pool #2, the network device selects the carrier 10, the carrier 12, and the carrier 13 to replace the carrier 1, the carrier 5, and the carrier 9.

Third, a resource C, which is a physical resource whose quality parameter value is lower than a preset threshold #2 (namely, an example of a second threshold) in the resource pool #2.

When the resource pool #1 includes one physical resource #1, the network device selects the physical resource #2 whose quality parameter value is lower than the preset threshold #2 in the resource pool #2 to replace the physical resource #1. For example, in an example in FIG. 3, the carrier 10 is a carrier whose quality parameter value is lower than the preset threshold #2 (for example, RIP value<interference offset+noise coefficient+noise floor, where the preset threshold #2 is a sum of values of the interference offset, the noise coefficient, and the noise floor) in the resource pool #2, the network device selects the carrier 10 to replace the carrier 1.

When the resource pool #1 includes a plurality of physical resources #1, the network device selects R physical resources #2 whose quality parameter values are lower than the preset threshold #2 in the resource pool #2 to replace R physical resources #1. For example, in an example in FIG. 4, the carrier 10, the carrier 12, and the carrier 13 are three carriers whose quality parameter values are lower than the preset threshold #2 (for example, three carriers whose RIP values are lower than the preset threshold #2) in the resource pool #2, the network device selects the carrier 10, the carrier 12, and the carrier 13 to replace the carrier 1, the carrier 5, and the carrier 9.

If the quality parameter values of the physical resources in the resource pool #2 are all greater than the preset threshold #2, the network device does not perform S240. That is, if no physical resource that satisfies the condition in the resource pool #2 replaces the physical resource #1, the physical resource #1 is not replaced.

In other words, when quality parameters of m physical resources #1 in the resource pool #1 satisfy the preset condition #1, and the resource pool #2 includes n physical resources #2 whose quality parameter values are lower than the preset threshold #2, the network device performs S240. If m≥n, n physical resources #1 in the resource pool #1 are replaced with the n physical resources #2 in the resource pool #2. If m<n, the m physical resources #1 in the resource pool #1 are replaced with m physical resources #2 in the resource pool #2. m and n are integers greater than or equal to 0.

Fourth, a resource D, which is a physical resource whose quality parameter value is lower than the quality parameter value of the physical resource #1 and that is in the resource pool #2.

The network device selects the physical resource whose quality parameter value is lower than the quality parameter value of the physical resource #1 and that is in the resource pool #2 to replace the physical resource #1.

If the quality parameter values of the physical resources in the resource pool #2 are all greater than the quality parameter value of the physical resource #1, the network device does not perform S240. That is, if no physical resource that satisfies the condition in the resource pool #2 replaces the physical resource #1, the physical resource #1 is not replaced.

In other words, when quality parameters of m physical resources #1 in the resource pool #1 satisfy the preset condition #1, and the resource pool #2 includes n physical resources #2 that satisfy the resource D, the network device performs S240. If m≥n, n physical resources #1 in resource pool #1 are replaced with the n physical resources #2 in resource pool #2. If m<n, the m physical resources #1 in the resource pool #1 are replaced with m physical resources #2 in the resource pool #2. The quality parameter value of the replaced physical resource #1 is greater than the quality parameter value of the physical resource #2 that replaces the physical resource #1, and m and n are integers greater than or equal to 0.

It should be noted that one or more of the four types of physical resources #2 may be combined with one or more of the three cases in which the quality parameter of the physical resource #1 satisfies the preset condition #1. For example, the case 1 is combined with a case in which the physical resource #2 is the resource D. To be specific, when the quality parameter value of the physical resource #1 in the resource pool #1 is greater than the threshold, and the quality parameter value of the physical resource #2 in the resource pool #2 is lower than that of the physical resource #1, the physical resource #1 is replaced with the physical resource #2. However, this application is not limited thereto.

S250: The network device sends indication information B (namely, an example of first indication information) to the terminal device, where the indication information B is used to indicate that the physical resource #1 in the resource pool #1 is replaced with the physical resource #2.

The network device notifies, by using the indication information B, the terminal device that the physical resource #1 in the resource pool #1 is replaced with the physical resource #2. After receiving the indication information B, the terminal device determines the replaced physical resource and the physical resource obtained after the replacement in the resource pool #1. In this way, the terminal device and the network device reach a consensus on the current resource pool #1.

By way of example rather than limitation, the indication information B indicates an index value of each physical resource included in the resource pool #1 obtained after the replacement. For example, the resource pool #1 obtained after the replacement in FIG. 3 includes carriers 0, 10, 2, 3, 4, 5, 6, 7, 8, and 9, and the indication information B indicates 0, 10, 2, 3, 4, 5, 6, 7, 8, and 9. After receiving the indication information B, the terminal device determines that the carrier 1 in the original resource pool #1 is replaced with the carrier 10.

By way of example rather than limitation, the indication information B indicates an index value of the replaced physical resource and an index value of the physical resource obtained after the replacement. That is, the indication information B indicates the index value of the physical resource #1 and the index value of the physical resource #2. For example, in FIG. 3, the carrier 1 in the original physical resource pool #1 is replaced with the carrier 10, and indication information B indicates 1 and 10. After receiving the indication information B, the terminal device determines that the carrier 1 in the original resource pool #1 is replaced with the carrier 10.

Based on this solution, interference on the physical resource that is in the resource pool #1 and that is used for communication between the network device and the terminal device can be kept low, to avoid interference, improve data transmission reliability, and reduce a data transmission delay.

Figure 5:
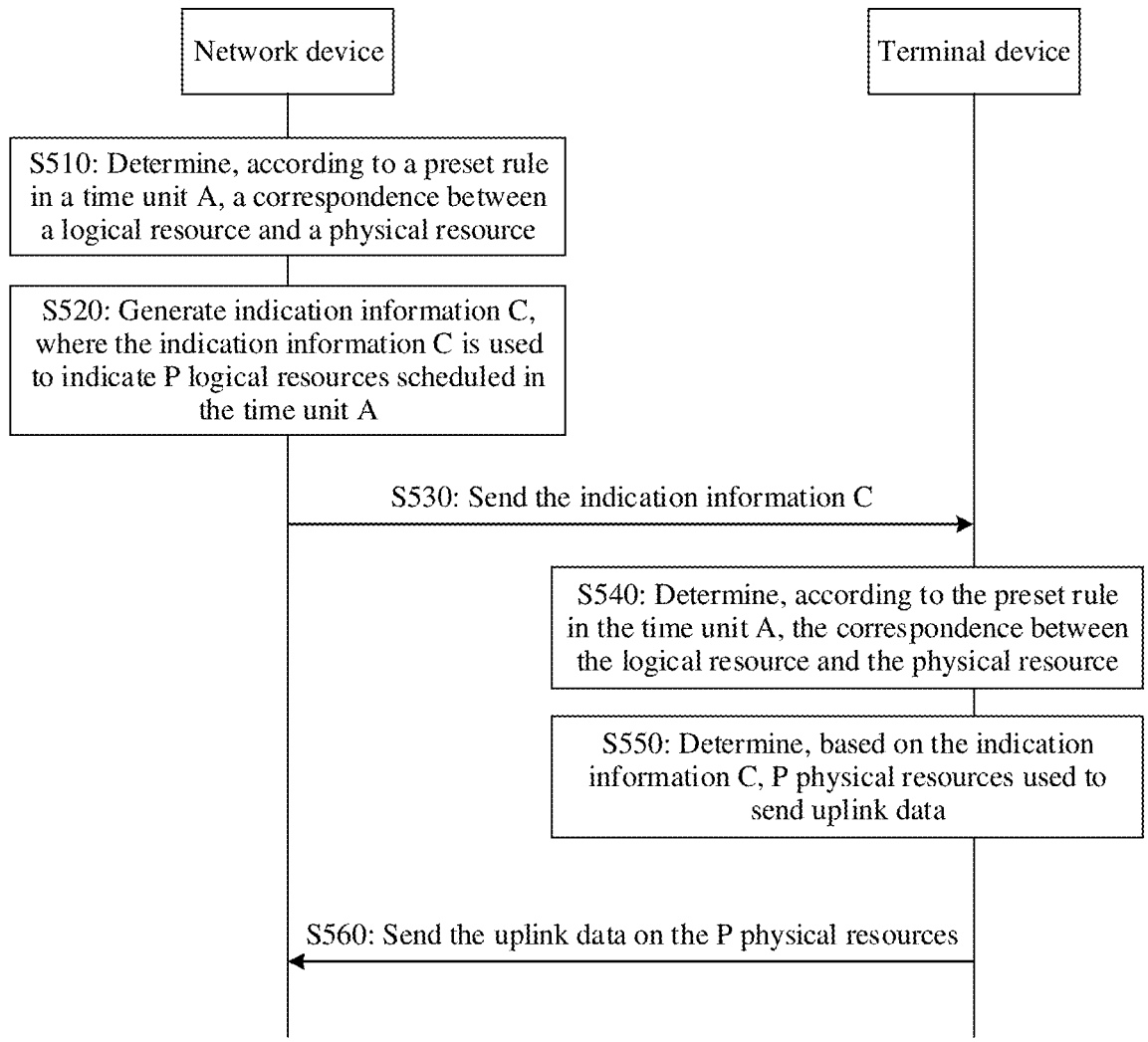
FIG. 5 is another schematic flowchart of a wireless communication resource allocation method according to this application.

FIG. 5 is another schematic flowchart of a wireless communication resource allocation method according to this application.

As described above, a physical resource in this application may be an uplink resource carrying uplink data, or may be a downlink resource carrying downlink data. An example in which the physical resource is the uplink resource carrying the uplink data is used for detailed description in FIG. 5.

S510: A network device calculates a correspondence between a logical resource and the physical resource in a time unit A (namely, an example of a first time unit).

S520: The network device generates indication information C (namely, an example of second indication information), where the indication information C is used to indicate P logical resources scheduled in the time unit A.

S530: The network device sends the indication information C to a terminal device.

S540: The terminal device calculates the correspondence between the logical resource and the physical resource in the time unit A.

S550: The terminal device determines, based on the indication information C, P physical resources used to send the uplink data.

S560: The terminal device sends the uplink data on the P physical resources.

In one time unit, physical resources in a resource pool #1 are in a one-to-one correspondence with logical resources. The network device and the terminal device determine, according to a preset rule in one time unit, the one-to-one correspondence between the physical resources in the resource pool #1 and the logical resources, for example, as described in S510 and S540. Therefore, the network device and the terminal device reach a consensus on the correspondence between the physical resource and the logical resource in each time unit. The network device indicates, by using the indication information C, the P logical resources scheduled in a time unit (for example, the time unit A), and notifies the terminal device that physical resources corresponding to the P logical resources are scheduled in the time unit A. After receiving the indication information C, the terminal device determines P physical resources scheduled in the time unit A, and sends the uplink data on the P physical resources in the time unit A.

By way of example rather than limitation, the time unit is a time unit for resource scheduling, and the time unit may be any one of a frame, a subframe, a slot, or an OFDM symbol.

By way of example rather than limitation, when the uplink data of the terminal device is uplink transmission based on scheduling and grant performed by the network device, the indication information C is carried in downlink control information for scheduling the uplink data. When the uplink data of the terminal device is grant-free uplink transmission, the indication information C is carried in an RRC message for allocating a grant-free uplink transmission resource.

By way of example rather than limitation, the indication information C may specifically indicate the scheduled logical resource by using a bitmap (or which may be referred to as a bit string), and indicator bits in the bitmap are in a one-to-one correspondence with the logical resources. When an indicator bit in the bitmap indicates "1", it indicates that a logical resource corresponding to the indicator bit is scheduled. When an indicator bit in the bitmap indicates "0", it indicates that a logical resource corresponding to the indicator bit is not scheduled. Alternatively, on the contrary, when an indicator bit in the bitmap indicates "0", it indicates that a logical resource corresponding to the indicator bit is scheduled. When an indicator bit in the bitmap indicates "1", it indicates that a logical resource corresponding to the indicator bit is not scheduled. In a bitmap indication manner, the network device may schedule one or more continuous logical resources, or may schedule one or more discontinuous logical resources.

By way of example rather than limitation, alternatively, the indication information C may specifically indicate one or more continuous scheduled logical resources by using a resource indication value (RIV). The terminal device may determine a sequence number of a scheduled start logical resource and a quantity of sequence numbers of the continuous logical resources based on the resource indication value, to determine a sequence number of each scheduled logical resource. In this RIV indication manner, a quantity of bits indicating the scheduled logical resource can be reduced, thereby reducing overheads of control information.

It should be noted that in this example, the network device and the terminal device determine the correspondence between the physical resource and the logical resource that are scheduled in the time unit A in S510 and S540. After determining each physical resource included in the resource pool #1, the network device and the terminal device may further determine the correspondence between the physical resource and the logical resource in each time unit in a specific time period according to the preset rule. For example, in FIG. 2, after obtaining the resource pool #1 after the replacement in S240, the network device generates the correspondence between the physical resource and the logical resource in each subframe (that is, a subframe is a time unit) in a system frame (that is, a system frame is a specific time period) according to the preset rule. After receiving the indication information A and determining the resource pool #1 obtained after the replacement in S220, the terminal device generates, according to the preset rule, the correspondence between the physical resource and the logical resource in each subframe included in a system frame. However, this application is not limited thereto.

In this application, the correspondence between the physical resource and the logical resource may be the same in each time unit, to reduce device processing complexity. Correspondences between physical resources and logical resources in different time units may alternatively be different, to implement frequency hopping transmission of communication data in different time units and avoid interference.

By way of example rather than limitation, the preset rule used to determine the physical resource and the logical resource in each time unit is a sequence or a formula. The sequence or the formula may be preset in a system, specified in a protocol, or indicated by the network device. For example, a logical resource corresponding to a physical resource in the resource pool #1 in a subframe is obtained by using a sequence used by the physical resource in the resource pool #1 in the subframe. Specifically, a sequence number of a logical resource corresponding to a physical resource in the resource pool #1 may be obtained by multiplying a sequence number of the physical resource by a value corresponding to the physical resource in a sequence. However, the present invention is not limited thereto.

Figure 6:
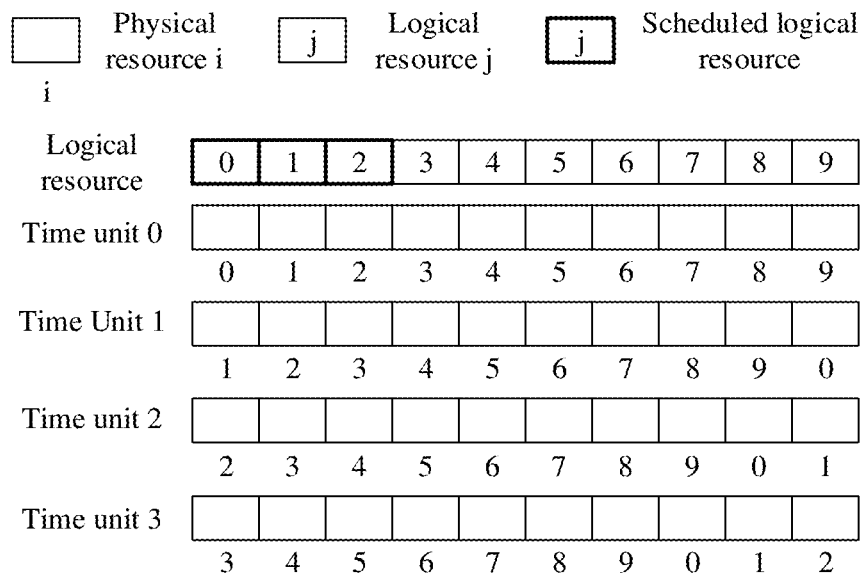
FIG. 6 is a schematic diagram of an example of a correspondence between a physical resource and a logical resource in each time unit according to this application.

For example, FIG. 6 shows correspondences between physical resources and logical resources in time units 0, 1, and 2. The correspondences may be specified in a system. A protocol specifies that a physical resource corresponding to a logical resource in each time unit is cyclically shifted forward by one physical resource sequence number compared with a previous time unit. For example, logical resources 0, 1, 2, . . . , 8, and 9 in the time unit 0 respectively correspond to physical resources whose sequence numbers are 0, 1, 2, . . . , 8, and 9 in the resource pool #1, and logical resources 0, 1, 2, . . . , 8, and 9 in the time unit 1 respectively correspond to physical resources 1, 2, 3, . . . , 8, 9, and 0. Therefore, compared with the time unit 0, a physical resource corresponding to a logical resource i in the time unit 1 is a physical resource corresponding to a logical resource i+1 in the time unit 0, and the physical resource 0 corresponding to the logical resource 0 in the time unit 0 is cyclically shifted to the physical resource corresponding to the logical resource 9 in the time unit 1. Similar situations occur in the time units 2 and 3.

Figure 7:
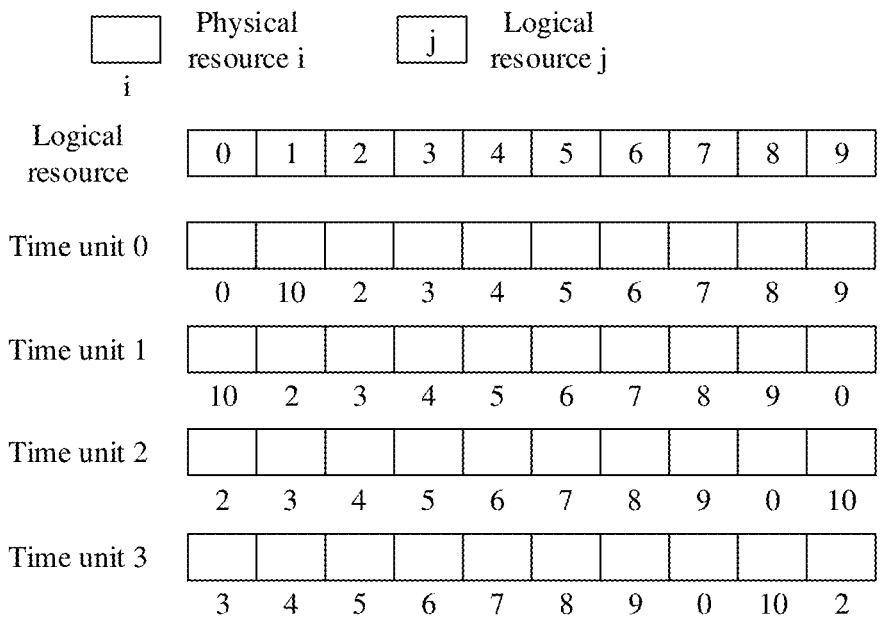
FIG. 7 is a schematic diagram of an example of a correspondence between a physical resource and a logical resource in each time unit after resource replacement according to this application.

A physical resource #1 in the resource pool #1 is replaced with a physical resource #2. It further indicates that, in one time unit, the physical resource #1 that corresponds to a logical resource #1 (namely, an example of a first logical resource) and that is determined according to the preset rule is replaced with the physical resource #2. For example, as shown in FIG. 3, if the quality parameter of the physical resource #1 in the physical resource pool #1 satisfies the preset condition #1, the physical resource 1 in the resource pool #1 is replaced with a physical resource 10 in the resource pool #2. The correspondences between the physical resources and the logical resources in the resource pool #1 before the replacement in the time units 0, 1, and 2 are shown in FIG. 6. Correspondences between physical resources and logical resources in the resource pool #1 after the replacement in the time units 0, 1, and 2 are shown in FIG. 7. The physical resource 1 corresponding to the logical resource 0 (that is, the logical resource 0 is the logical resource #1) is replaced with the physical resource 10 in the time unit 0. When the indication information C sent by the network device indicates that the logical resource 0 is scheduled in the time unit 0, the terminal device sends the uplink data on the physical resource 10, that is, the physical resource 10 is used to carry the uplink data in the time unit 0. When the indication information C indicates that the logical resources 1, 4, and 5 are scheduled, the terminal device sends the uplink data on the physical resources 10, 4, and 5 corresponding to the logical resources 1, 4, and 5. Similarly, the physical resource 1 corresponding to the logical resource 9 (that is, the logical resource 9 is the logical resource #1) is replaced with the physical resource 10 in the time unit 1, and the physical resource 1 corresponding to the logical resource 8 (that is, the logical resource 8 is the logical resource #1) is replaced with the physical resource 10 in the time unit 1.

Figure 8:
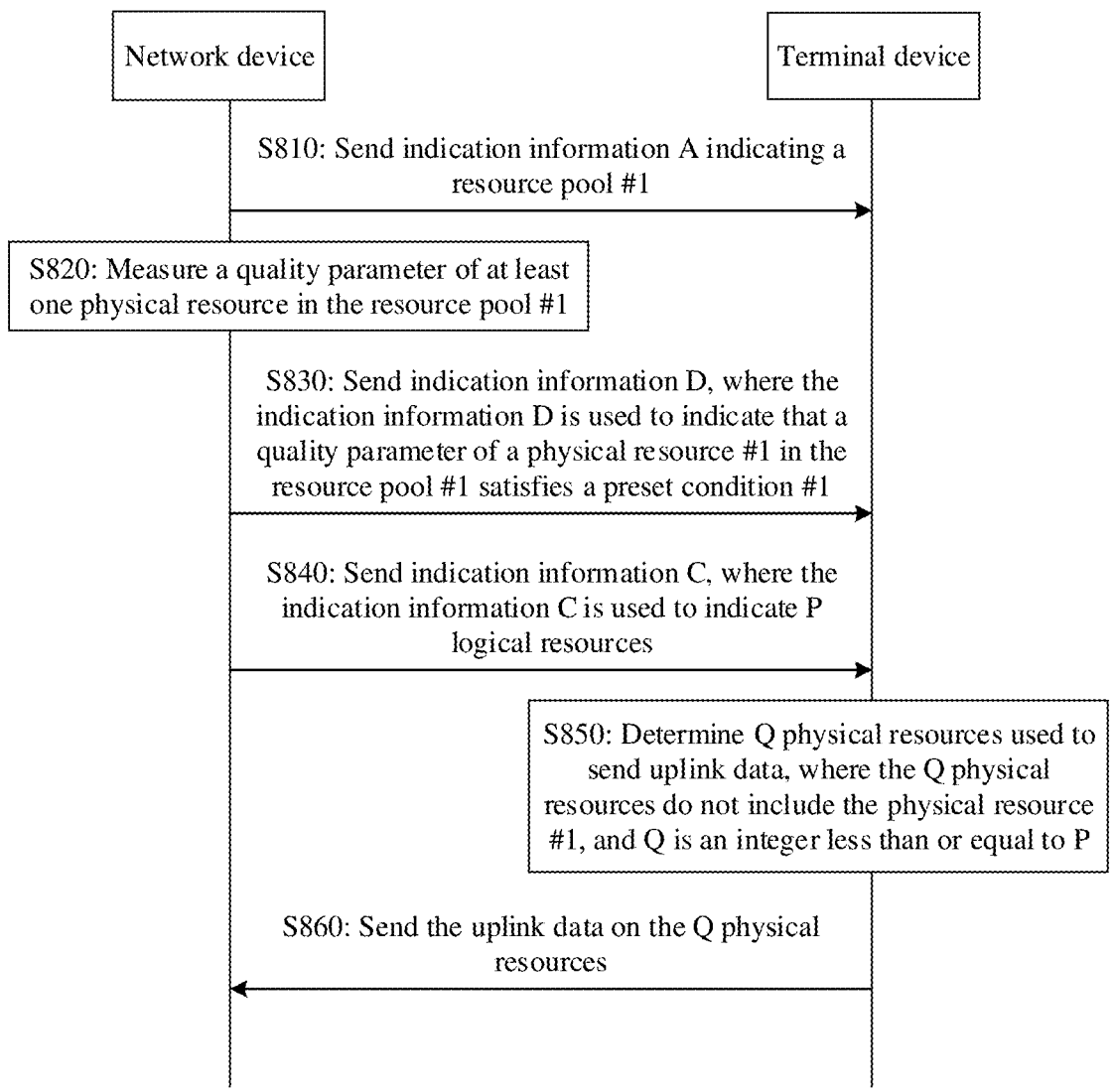
FIG. 8 is another schematic flowchart of a wireless communication resource allocation method according to this application.

FIG. 8 is another schematic flowchart of a wireless communication resource allocation method according to this application.

As described above, a physical resource in this application may be an uplink resource carrying uplink data, or may be a downlink resource carrying downlink data. An example in which the physical resource is the uplink resource carrying the uplink data is used for detailed description in FIG. 5.

S810: A network device sends, to a terminal device, indication information A used to indicate a resource pool #1.

S820: The network device measures a quality parameter of at least one physical resource in the resource pool #1.

S830: The network device sends indication information D to the terminal device, where the indication information D is used to indicate that a quality parameter of a physical resource #1 in the resource pool #1 satisfies a preset condition #1.

S840: The network device sends indication information C to the terminal device, where the indication information C is used to indicate P logical resources scheduled in a time unit A.

S850: The terminal device determines Q physical resources used to send the uplink data, where the Q physical resources do not include the physical resource #1, and Q is an integer less than or equal to P.

S860: The terminal device sends the uplink data on the Q physical resources.

For content in this embodiment the same as that in the foregoing embodiments, refer to a corresponding process in the foregoing embodiments. For brevity, details are not described herein again.

After the network device measures the quality parameter of the at least one physical resource in the resource pool #1 in S820, where the resource pool #1 includes the physical resource #1, and when the quality parameter of the physical resource #1 satisfies the preset condition #1, the network device sends the indication information D to the terminal device, to notify the terminal device that the quality parameter of the physical resource #1 in the resource pool #1 satisfies the preset condition #1. After the terminal device receives the indication information D, the network device and the terminal device reach a consensus that the quality parameter of the physical resource #1 satisfies the preset condition #1, and the network device and the terminal device determine not to receive or send communication data on the physical resource #1.

According to this solution, when detecting that the resource pool #1 includes a physical resource with high interference (namely, a physical resource that satisfies the preset condition #1), the network device notifies the terminal device of the physical resource with high interference by using indication information. After the terminal receives the indication information, the network device and the terminal device reach a consensus that the communication data is not received or sent on the physical resource #1. In this solution, the network device and the terminal device can keep communicating with each other by using a physical resource with low interference in the resource pool #1, to avoid interference, improve data transmission reliability, and further reduce a data transmission delay.

In this solution, when the uplink data is uplink transmission based on scheduling and granting performed by the network device, after the terminal device receives the indication information D, the network device selects physical resources that do not include the physical resource #1 to carry the uplink data, and does not schedule the physical resource #1 to carry the uplink data. That is, the indication information C that is for scheduling or granting an uplink resource and that is sent by the network device to the terminal device indicates that the physical resource #1 is not scheduled. Specifically, the indication information C indicates P logical resources scheduled in the time unit A, where the P logical resources do not include a logical resource #1, and the logical resource #1 is a logical resource corresponding to the physical resource #1 indicated by a preset rule in the time unit A.

Figure 9:
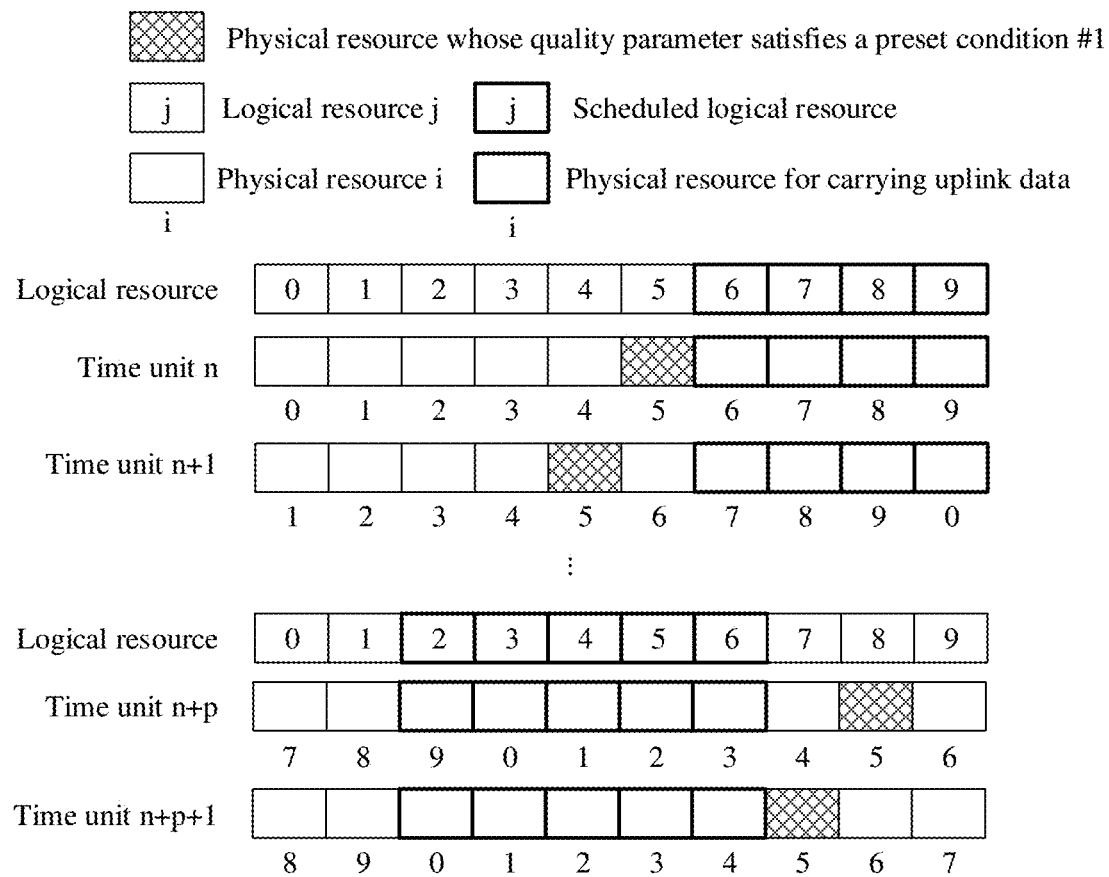
FIG. 9 is a schematic diagram of an example of grant-based uplink transmission according to this application.

For example, as shown in FIG. 9, after the measurement, the network device determines that a RIP value of a physical resource 5 in the resource pool #1 is greater than a threshold, and sends the indication information D to indicate that an index value of the physical resource 5 is 5. After receiving the indication information D, the terminal device determines that the RIP value of the physical resource 5 is greater than the threshold, and further determines that the network device does not schedule the physical resource 5 to carry the communication data. As shown in FIG. 9, when the terminal device requests to send the uplink data, the network device needs to authorize the terminal device to transmit the uplink data on eight physical resources, and the network device avoids scheduling the physical resource 5. For example, the network device schedules physical resources 6, 7, 8, and 9 corresponding to logical resources 6, 7, 8, and 9 in a time unit n and physical resources 7, 8, 9, and 0 corresponding to the logical resources 6, 7, 8, and 9 in a time unit n+1. A total of eight physical resources are authorized to the terminal device for uplink data transmission.

For another example, the network device needs to authorize the terminal device with 10 physical resources to carry the uplink data, and the network device avoids scheduling the physical resource 5. The indication information C indicates that logical resources 2, 3, 4, 5, and 6 in a time unit n+p and in a time unit n+p+1 are scheduled. After receiving the indication information C, the terminal device determines that physical resources 9, 0, 1, 2, and 3 corresponding to the logical resources 2, 3, 4, 5, and 6 in the time unit n+p and physical resources 0, 1, 2, 3, and 4 corresponding to the logical resources 2, 3, 4, 5, and 6 in the time unit n+p+1 are authorized, and the terminal device sends the uplink data on the 10 authorized physical resources.

After the terminal device receives the indication information D, if the received indication information C indicates that the network device schedules the logical resource corresponding to the physical resource #1 in one time unit, the terminal device determines that an error occurs in the indication information C, and discards the indication information C, that is, the terminal device executes an indication of the indication information C in which the error occurs.

When the uplink data is grant-free uplink transmission, the indication information C is carried in an RRC message for allocating a resource to grant-free uplink transmission, and the indication information C indicates P logical resources. After the terminal device receives the indication information D indicating that the quality parameter of the physical resource #1 satisfies the preset condition #1, if the logical resource #1 in the P logical resources corresponds to the physical resource #1 in a time interval, the grant-free uplink transmission sent by the terminal device is not mapped to the physical resource #1. In other words, after the terminal device receives the indication information D, the physical resource #1 is not used to carry the grant-free uplink transmission.

Figure 10:
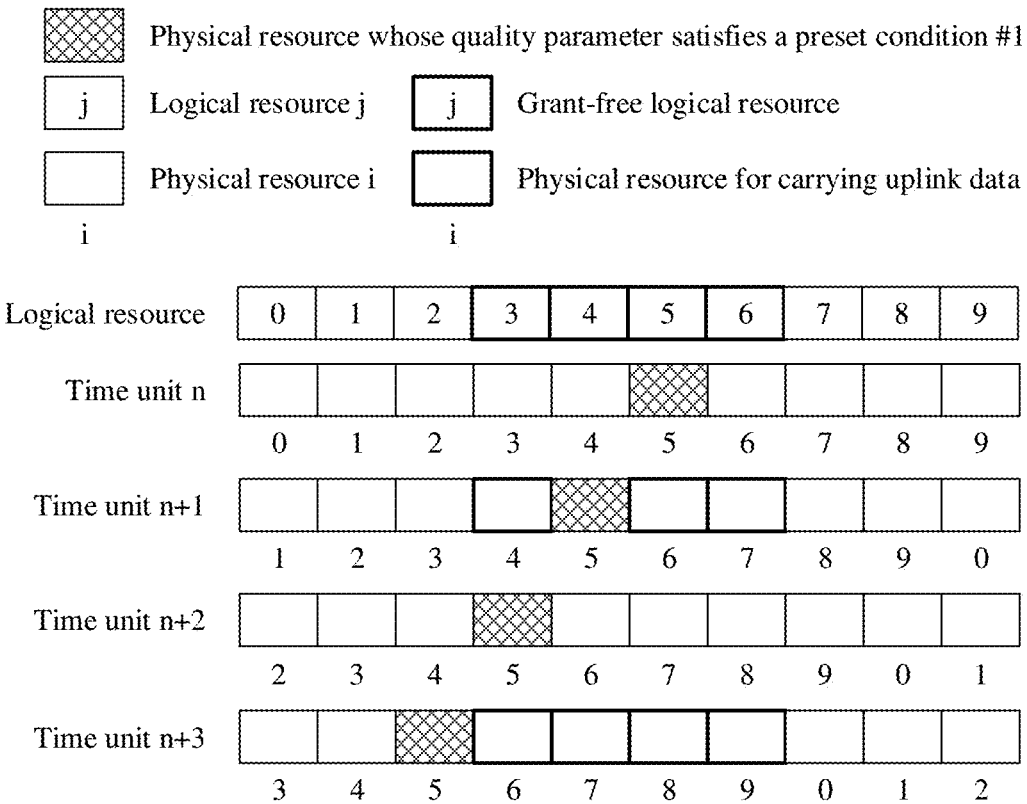
FIG. 10 is a schematic diagram of an example of grant-free uplink transmission according to this application.

For example, as shown in FIG. 10, the indication information C sent by the network device indicates that grant-free uplink transmission resources are logical resources 3, 4, 5, and 6, and the terminal device receives the indication information D in a time interval n, where the indication information D indicates that a quality parameter of a physical resource 5 satisfies the preset condition #1. If the terminal device sends grant-free uplink data in a time unit n+1, the terminal device first determines, according to the preset rule, physical resources corresponding to logical resources 3, 4, 5, and 6 in the time unit n+1 are physical resources 4, 5, 6, and 7, where because the indication information D indicates that the quality parameter of the physical resource 5 satisfies the preset condition #1, the physical resource 5 does not carry the uplink data, and the physical resources 4, 6, and 7 are used to carry the uplink data; and then the terminal device maps the uplink data to some or all of the physical resources 4, 6, and 7. By way of example rather than limitation, that the physical resource 5 does not carry the data may be that the uplink data resource is sequentially mapped to the physical resources 4, 6, and 7. If resources in the physical resources 4, 6, and 7 can completely carry the current uplink data, remaining uplink data is sent on an available physical resource in another subsequent time unit. That the physical resource 5 does not carry the data may alternatively be that the uplink data that originally needs to be mapped to the physical resource 5 may be sent in another subsequent time unit. However, this application is not limited thereto.

For another example, if the terminal device sends the grant-free uplink data in a time unit n+3, the terminal device first determines, according to the preset rule, that physical resources corresponding to logical resources 4, 5, 6, and 7 in the time unit n+3 are physical resources 6, 7, 8, and 9 and do not include the physical resource 5 indicated by the indication information D, where the physical resources 6, 7, 8, and 9 are used to carry the uplink transmission; and then the terminal device maps the uplink data to some or all of the physical resources 6, 7, 8, and 9.

It should be understood that sequence numbers of the processes do not mean execution sequences in the foregoing embodiments. The execution sequences of the processes should be determined based on functions and internal logic of the processes, and should not be construed as any limitation on the implementation processes of the embodiments of this application.

The methods provided in the embodiments of this application are described above in detail with reference to FIG. 2 to FIG. 8. Apparatuses provided in the embodiments of this application are described below in detail with reference to FIG. 11 to FIG. 13.

Figure 11:
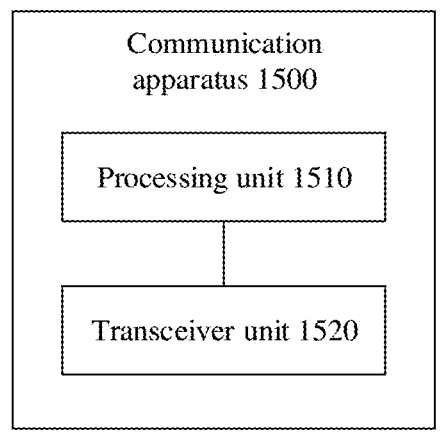
FIG. 11 is a schematic block diagram of an example of a wireless communication apparatus according to this application.

FIG. 11 is a schematic block diagram of a communication apparatus according to an embodiment of this application. As shown in FIG. 11, the communication apparatus 1500 may include a processing unit 1510 and a transceiver unit 1520.

In a possible design, the communication apparatus 1500 may correspond to the terminal device in the foregoing method embodiments, for example, may be the terminal device, or may be a chip disposed in the terminal device.

It should be understood that the communication apparatus 1500 may correspond to the terminal device in the methods 200, 500, and 800 according to the embodiments of this application. The communication apparatus 1500 may include units configured to perform the methods performed by the terminal device in the method 200 in FIG. 2, the method 500 in FIG. 5, and the method 800 in FIG. 8. In addition, the units in the communication apparatus 1500 and the foregoing other operations and/or functions are respectively intended to implement corresponding procedures of the method 200 in FIG. 2, the method 500 in FIG. 5, and the method 800 in FIG. 8.

When the communication apparatus 1500 is configured to perform the method 200 in FIG. 11, the transceiver unit 1520 may be configured to perform S220 and S250 in the method 200. When the communication apparatus 1500 is configured to perform the method 500 in FIG. 11, the processing unit 1510 may be configured to perform S540 and S550 in the method 500, and the transceiver unit 1520 may be configured to perform S530 and S560 in the method 500. When the communication apparatus 1500 is configured to perform the method 800 in FIG. 8, the processing unit 1510 may be configured to perform S850 in the method 800, and the transceiver unit 1520 may be configured to perform S810, S830, and S840 in the method 800. It should be understood that a specific process in which the units perform the foregoing corresponding steps is described in detail in the foregoing method embodiments, and for brevity, details are not described herein.

Figure 12:
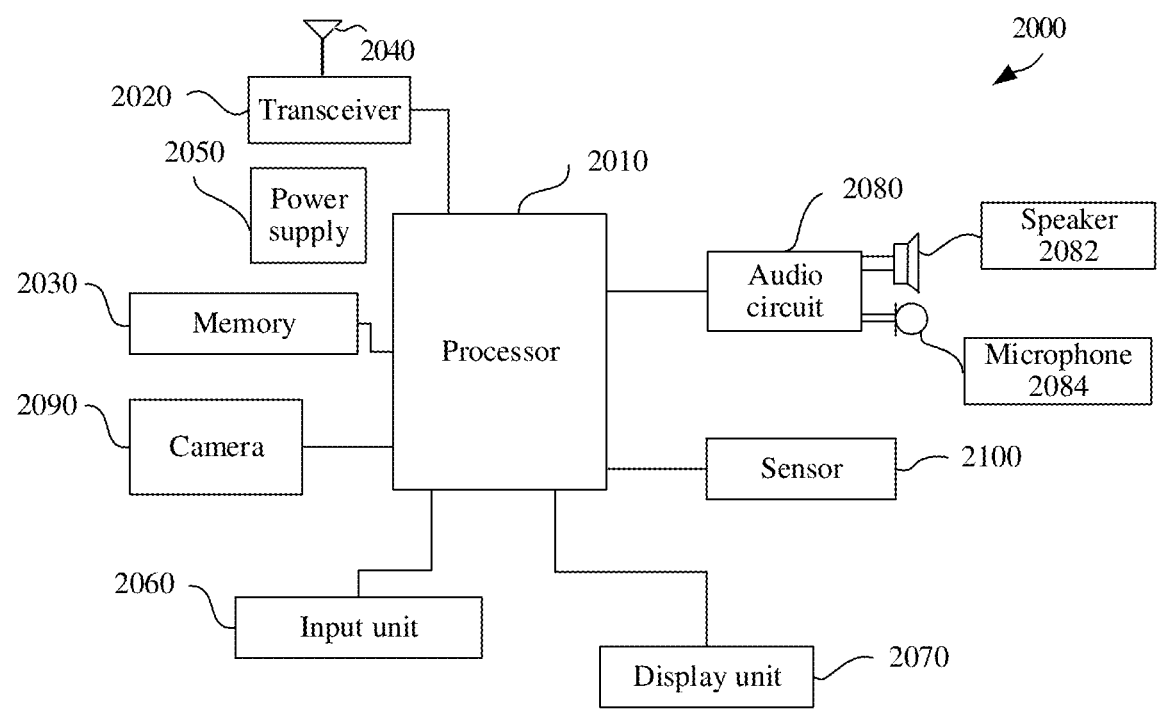
FIG. 12 is a schematic diagram of a structure of an example of a terminal device according to this application.

It should be further understood that, when the communication apparatus 1500 is the terminal device, the transceiver unit 1520 in the communication apparatus 1500 may correspond to a transceiver 2200 in a terminal device 2000 shown in FIG. 12, and the processing unit 1110 in the communication apparatus 1100 may correspond to a processor 2010 in the terminal device 2000 shown in FIG. 12.

It should be further understood that, when the communication apparatus 1500 is the terminal device, the transceiver unit 1520 in the communication apparatus 1500 may be implemented by using a communication interface (for example, a transceiver or an input/output interface), for example, may correspond to the transceiver 2020 in the terminal device 2000 shown in FIG. 12; and the processing unit 1510 in the communication apparatus 1500 may be implemented by using at least one processor, for example, may correspond to the processor 2010 in the terminal device 2000 shown in FIG. 12.

Optionally, the communication apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps is described in detail in the foregoing method embodiments, and for brevity, details are not described herein.

In another possible design, the communication apparatus 1500 may correspond to the network device in the foregoing method embodiments, for example, may be the network device, or may be a chip disposed in the network device.

It should be understood that the communication apparatus 1500 may correspond to the network device in the methods 200, 500, and 800 according to the embodiments of this application. The communication apparatus 1500 may include units configured to perform the methods performed by the network device in the method 200 in FIG. 2, the method 500 in FIG. 5, and the method 800 in FIG. 8. In addition, the units in the communication apparatus 1500 and the foregoing other operations and/or functions are respectively intended to implement corresponding procedures of the method 200 in FIG. 2, the method 500 in FIG. 5, and the method 800 in FIG. 8.

When the communication apparatus 1500 is configured to perform the method 200 in FIG. 2, the processing unit 1510 may be configured to perform S210, S230, and S240 in the method 200, and the transceiver unit 1120 may be configured to perform S220 and S250 in the method 200. When the communication apparatus 1500 is configured to perform the method 500 in FIG. 5, the processing unit 1510 may be configured to perform S510 and S520 in the method 500, and the transceiver unit 1520 may be configured to perform S530 and S560 in the method 500. It should be understood that a specific process in which the units perform the foregoing corresponding steps is described in detail in the foregoing method embodiments, and for brevity, details are not described herein.

Figure 13:
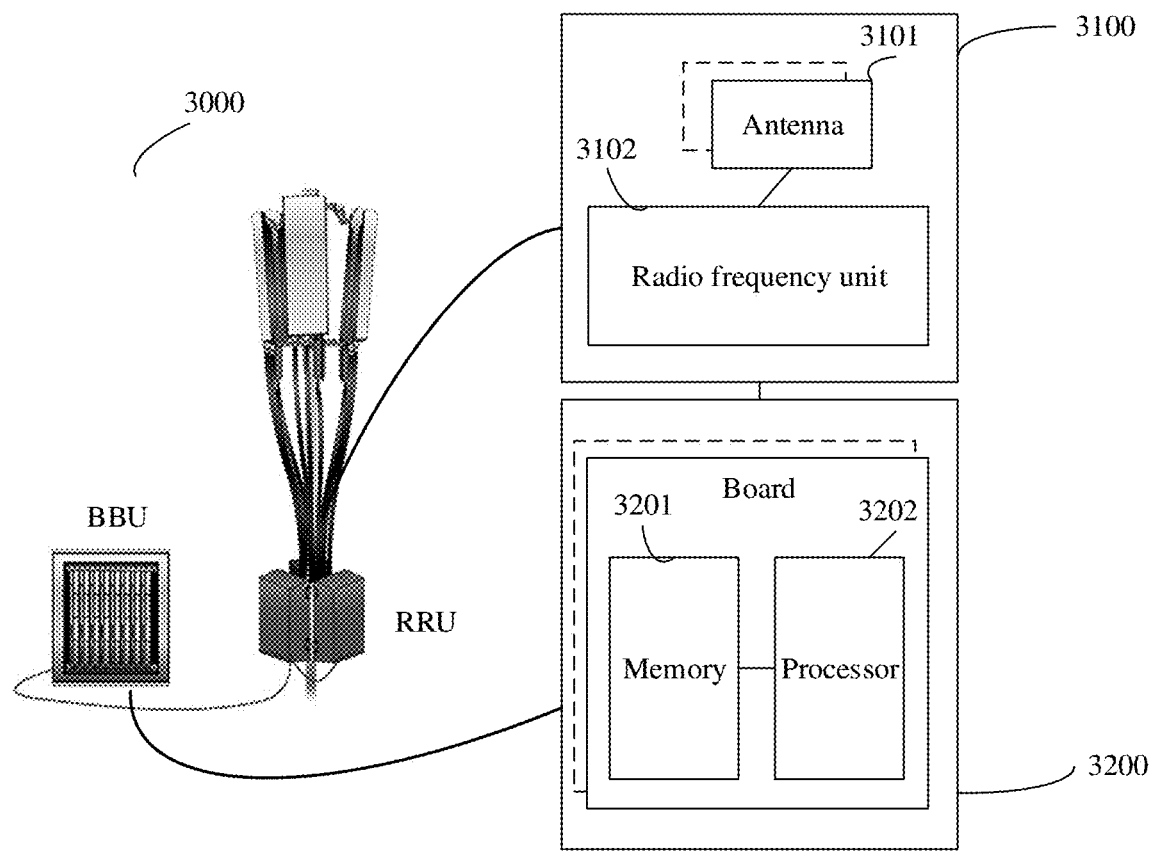
FIG. 13 is a schematic diagram of a structure of an example of a network device according to this application.

It should be further understood that, when the communication apparatus 1500 is the network device, the transceiver unit in the communication apparatus 1500 may correspond to a transceiver 3100 in a network device 3000 shown in FIG. 13, and the processing unit 1510 in the communication apparatus 1500 may correspond to a processor 3202 in the network device 3000 shown in FIG. 13.

Optionally, the communication apparatus 1500 may further include a storage unit. The storage unit may be configured to store instructions or data. The processing unit may invoke the instructions or the data stored in the storage unit, to implement a corresponding operation.

It should be understood that a specific process in which the units perform the foregoing corresponding steps is described in detail in the foregoing method embodiments, and for brevity, details are not described herein.

It should be further understood that, when the communication apparatus 1500 is the network device, the transceiver unit 1520 in the communication apparatus 1500 may be implemented by using a communication interface (for example, a transceiver or an input/output interface), for example, may correspond to the transceiver 3100 in the network device 3000 shown in FIG. 13; and the processing unit 1510 in the communication apparatus 1500 may be implemented by using at least one processor, for example, may correspond to the processor 3202 in the network device 3000 shown in FIG. 13.

FIG. 12 is a schematic diagram of a structure of a terminal device 2000 according to an embodiment of this application. The terminal device 2000 may be used in the system shown in FIG. 1, to perform a function of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 11.

The transceiver 2020 may correspond to the transceiver unit in FIG. 11. The transceiver 2020 may include a receiver (or referred to as a receiver or a receiver circuit) and a transmitter (or referred to as a transmitter or a transmitter circuit). The receiver is configured to receive a signal, and the transmitter is configured to transmit a signal.

It should be understood that the terminal device 2000 shown in FIG. 12 can implement the processes of the terminal device in the method embodiments shown in FIG. 2, FIG. 5, and FIG. 8. Operations and/or functions of the modules in the terminal device 2000 are intended to implement the corresponding procedures in the foregoing method embodiment. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending to a network device or receiving from a network device that is performed by the terminal device and that is described in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 13 is a schematic diagram of a structure of a network device according to an embodiment of this application, for example, may be a schematic diagram of a structure of a base station.

It should be understood that the base station 3000 shown in FIG. 13 can implement the processes of the network device in the method embodiments shown in FIG. 2, FIG. 5, and FIG. 8. Operations and/or functions of the modules in the base station 3000 are intended to implement corresponding procedures in the foregoing method embodiment. For details, refer to the descriptions in the foregoing method embodiments. To avoid repetition, detailed descriptions are properly omitted herein.

It should be understood that, the base station 3000 shown in FIG. 13 is merely a possible architecture of the network device, and this shall not constitute any limitation on this application. The method provided in this application is applicable to a network device of another architecture, for example, a network device including a CU, a DU, and an AAU. A specific architecture of the network device is not limited in this application.

An embodiment of this application further provides a processing apparatus. The processing apparatus includes a processor and an interface. The processor is configured to perform the method according to any one of the foregoing method embodiments.

It should be understood that, the processing apparatus may be one or more chips. For example, the processing apparatus may be a field programmable gate array (FPGA), an application-specific integrated circuit (ASIC), a system on chip (SoC), a central processor unit (CPU), a network processor (NP), a digital signal processing circuit (DSP), a micro controller unit (MCU), or a programmable logic device (PLD) or another integrated chip.

In an implementation process, the steps in the foregoing methods may be implemented by using a hardware integrated logical circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be implemented by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processing apparatus may implement or perform the methods, steps, and logical block diagrams that are disclosed in the embodiments of this application. The general-purpose processor may be a microprocessor, or the processor may be any conventional processor or the like. The steps of the methods disclosed with reference to the embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memories of the systems and methods described in this specification are intended to include but are not limited to these memories and a memory of any other proper type.

According to the methods provided in the embodiments of this application, this application further provides a computer program product. The computer program product includes computer program code. When the computer program code is run on a computer, the computer is enabled to perform the methods in the embodiments shown in FIG. 2, FIG. 5, and FIG. 8.

According to the methods provided in the embodiments of this application, this application further provides a computer-readable medium. The computer-readable medium stores program code. When the program code is run on a computer, the computer is enabled to perform the methods in the embodiments shown in FIG. 2, FIG. 5, and FIG. 8.

According to the methods provided in the embodiments of this application, this application further provides a system. The system includes the foregoing one or more terminal devices and the foregoing one or more network devices.

The network device and the terminal device in the foregoing apparatus embodiments completely correspond to the terminal device or network device in the method embodiments. A corresponding module or unit performs a corresponding step. For example, a communication unit (a transceiver) performs a sending or receiving step in the method embodiments, and a processing unit (a processor) performs a step other than the sending or receiving step. For a function of a specific unit, refer to a corresponding method embodiment. There may be one or more processors.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the terminal device or network device in the method embodiments. A corresponding module or unit performs a corresponding step. For example, a communication unit (a transceiver) performs a sending or receiving step in the method embodiments, and a processing unit (a processor) performs a step other than the sending or receiving step. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

In the foregoing embodiments, all or some of the functions of the function units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in a form of a software function unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods according to the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication resource allocation method, comprising:
    allocating, by a network device, a first resource pool and a second resource pool to a terminal device, wherein the first resource pool comprises K physical resources, a physical resource in the first resource pool is usable to carry communication data, the second resource pool comprises L physical resources, a physical resource in the second resource pool is a candidate resource for the first resource pool, and K and L are integers greater than or equal to 1;
    measuring, by the network device, a quality parameter of at least a first physical resource in the first resource pool; and
    sending, by the network device, first indication information to the terminal device in response to the quality parameter of the first physical resource in the first resource pool satisfying a first preset condition, wherein the first indication information indicates that the first physical resource in the first resource pool is replaced with a second physical resource in the second resource pool,
    wherein the method further comprises determining, by the network device according to a preset rule in a first time unit, a one-to-one correspondence between the K physical resources in the first resource pool and K logical resources, and wherein the first indication information indicates that the first physical resource which corresponds to a first logical resource and which is indicated by the preset rule is replaced with the second physical resource in the first time unit.

2. The method according to claim 1, wherein the quality parameter of the first physical resource comprises at least one of:
   received interference power (RIP) on the first physical resource,
   energy of interference on the first physical resource,
   a ratio of noise to a valid signal on the first physical resource, or
   strength of an interfering signal on the first physical resource.

3. The method according to claim 1, wherein the quality parameter of the first physical resource in the first resource pool satisfying the first preset condition comprises at least one of:
   a quality parameter value of the quality parameter of the first physical resource is greater than a first preset threshold;
   a quality parameter value of the quality parameter of the first physical resource is greater than a quality parameter value of the quality parameter of the second physical resource; or
   a quality parameter value of the quality parameter of the first physical resource is greater than a quality parameter value of the quality parameter of at least one physical resource in the second resource pool.

4. The method according to claim 1, wherein the second physical resource comprises at least one of:
   a physical resource whose quality parameter value of the quality parameter is the lowest in the second resource pool;
   a physical resource whose quality parameter value of the quality parameter is lower than a second preset threshold in the second resource pool; or
   a physical resource whose quality parameter value of the quality parameter in the second resource pool is lower than the quality parameter value of the quality parameter of the first physical resource.

5. The method according to claim 1, wherein the first indication information indicates an index value of each physical resource comprised in the first resource pool obtained after replacing the first physical resource in the first resource pool with the second physical resource.

6. The method according to claim 1, wherein the first indication information indicates an index value of the first physical resource and an index value of the second physical resource.

7. The method according to claim 1, further comprising:
   sending, by the network device, second indication information to the terminal device, wherein the second indication information indicates P logical resources scheduled in the first time unit, and P is an integer less than or equal to K; and
   at least one of
      sending, by the network device, downlink data to the terminal device on physical resources corresponding to the P logical resources, or
      receiving, by the network device on physical resources corresponding to the P logical resources, uplink data sent by the terminal device.

8. A terminal device, comprising:
   a processor; and
   a memory coupled to the processor, wherein the memory comprise instructions that, when executed by the processor, cause the terminal device to perform operations comprising:
   determining a first resource pool allocated by a network device to the terminal device, wherein the first resource pool comprises K physical resources, a physical resource in the first resource pool is usable to carry communication data, and K is an integer greater than or equal to 1;
   receiving first indication information sent by the network device, wherein the first indication information indicates that a first physical resource in the first resource pool is replaced with a second physical resource in a second resource pool allocated by the network device to the terminal device, the second resource pool comprises L physical resources which are candidate resources for the first resource pool, and L is an integer greater than or equal to 1; and
   replacing the first physical resource with the second physical resource based on the first indication information,
   wherein the operations further comprise determining, according to a preset rule in a first time unit, a one-to-one correspondence between the K physical resources in the first resource pool and K logical resources, and
   wherein, in said replacing, the first physical resource that corresponds to a first logical resource and that is indicated by the preset rule is replaced with the second physical resource in the first time unit.

9. The terminal device according to claim 8, wherein the first indication information indicates an index value of each physical resource comprised in the first resource pool obtained after said replacing the first physical resource in the first resource pool with the second physical resource.

10. The terminal device according to claim 8, wherein the first indication information indicates an index value of the first physical resource and an index value of the second physical resource.

11. The terminal device according to claim 8, wherein the operations further comprise:
   receiving second indication information sent by the network device, wherein the second indication information indicates P logical resources scheduled in the first time unit, and P is an integer less than or equal to K; and
   at least one of
      receiving, on physical resources corresponding to the P logical resources, downlink data sent by the network device, or
      sending, on physical resources corresponding to the P logical resources, uplink data to the network device.

12. A network device, comprising:
   a processor; and
   a memory coupled to the processor, wherein the memory comprise instructions that, when executed by the processor, cause the network device to perform operations comprising:
   allocating a first resource pool and a second resource pool to a terminal device, wherein the first resource pool comprises K physical resources, a physical resource in the first resource pool is usable to carry communication data, the second resource pool comprises L physical resources, a physical resource in the second resource pool is a candidate resource for the first resource pool, and K and L are integers greater than or equal to 1;

measuring a quality parameter of at least a first physical resource in the first resource pool; and sending first indication information to the terminal device in response to the quality parameter of the first physical resource in the first resource pool satisfying a first preset condition, wherein the first indication information indicates that the first physical resource in the first resource pool is replaced with a second physical resource in the second resource pool, wherein the operations further comprise determining, according to a preset rule in a first time unit, a one-to-one correspondence between the K physical resources in the first resource pool and K logical resources, and wherein the first indication information indicates that the first physical resource which corresponds to a first logical resource and which is indicated by the preset rule is replaced with the second physical resource in the first time unit.

13. The network device according to claim 12, wherein the quality parameter of the first physical resource comprises at least one of:
   received interference power (RIP) on the first physical resource,
   energy of interference on the first physical resource,
   a ratio of noise to a valid signal on the first physical resource, or
   strength of an interfering signal on the first physical resource.

14. The network device according to claim 12, wherein the quality parameter of the first physical resource in the first resource pool satisfying the first preset condition comprises at least one of:
   a quality parameter value of the quality parameter of the first physical resource is greater than a first preset threshold;
   a quality parameter value of the quality parameter of the first physical resource is greater than a quality parameter value of the quality parameter of the second physical resource; or
   a quality parameter value of the quality parameter of the first physical resource is greater than a quality parameter value of the quality parameter of at least one physical resource in the second resource pool.

15. The network device according to claim 12, wherein the second physical resource comprises at least one of:
   a physical resource whose quality parameter value of the quality parameter is the lowest in the second resource pool;
   a physical resource whose quality parameter value of the quality parameter is lower than a second preset threshold in the second resource pool; or
   a physical resource whose quality parameter value of the quality parameter in the second resource pool is lower than the quality parameter value of the quality parameter of the first physical resource.

16. The network device according to claim 12, wherein the first indication information indicates an index value of each physical resource comprised in the first resource pool obtained after replacing the first physical resource in the first resource pool with the second physical resource.

17. The network device according to claim 12, wherein the first indication information indicates an index value of the first physical resource and an index value of the second physical resource.

18. The network device according to claim 12, wherein the operations further comprise:
   sending second indication information to the terminal device, wherein the second indication information indicates P logical resources scheduled in the first time unit, and P is an integer less than or equal to K; and
   at least one of
      sending downlink data to the terminal device on physical resources corresponding to the P logical resources, or
      receiving, on physical resources corresponding to the P logical resources, uplink data sent by the terminal device.

* * * * *